(12) United States Patent
Ouyang

(10) Patent No.: US 12,151,759 B2
(45) Date of Patent: Nov. 26, 2024

(54) ADJUSTABLE SEAT FOR BICYCLE, EXERCISE MACHINE OR THE LIKE

(71) Applicant: Jian Xiang Ouyang, Temple City, CA (US)

(72) Inventor: Jian Xiang Ouyang, Temple City, CA (US)

( * ) Notice: Subject to any disclaimer, the term of this patent is extended or adjusted under 35 U.S.C. 154(b) by 147 days.

(21) Appl. No.: 17/893,134

(22) Filed: Aug. 22, 2022

(65) Prior Publication Data

US 2023/0080662 A1 Mar. 16, 2023

Related U.S. Application Data

(63) Continuation-in-part of application No. 17/067,626, filed on Oct. 9, 2020, now abandoned.

(51) Int. Cl.
*B62J 1/10* (2006.01)

(52) U.S. Cl.
CPC ........................................ *B62J 1/10* (2013.01)

(58) Field of Classification Search
CPC .............. B62J 1/005; B62J 1/007; B62J 1/10
See application file for complete search history.

(56) References Cited

U.S. PATENT DOCUMENTS

| | | | | |
|---|---|---|---|---|
| 455,058 A * | 6/1891 | Rhoades | ..................... | B62J 1/10 248/584 |
| 593,331 A * | 11/1897 | Noirit | ..................... | B62J 1/005 297/207 |
| 604,068 A * | 5/1898 | Morgan | ................... | B62J 1/005 297/204 |
| 608,682 A * | 8/1898 | Jamieson | ................. | B62J 1/005 297/201 |
| 619,204 A * | 2/1899 | Moore | ..................... | B62J 1/005 297/201 |
| 622,357 A * | 4/1899 | Hitchcock | ............... | B62J 1/005 297/202 |
| 629,956 A * | 8/1899 | Craig | ....................... | B62J 1/005 297/201 |
| 633,487 A * | 9/1899 | Radermacher | .......... | B62J 1/005 297/207 |
| 635,598 A * | 10/1899 | Rowe | ...................... | B62J 1/005 297/207 |
| 694,875 A * | 3/1902 | Meighan | .................. | B62J 1/005 297/201 |

(Continued)

*Primary Examiner* — Robert Canfield
(74) *Attorney, Agent, or Firm* — David & Raymond Patent Firm; Raymond Y Chan

(57) ABSTRACT

An adjustable seat includes a seat frame and an adjustable assembly. The seat frame includes a first seat body and a second seat body spaced apart each other to define an adjustment channel between the first and second seat bodies. The adjustable assembly, which supported underneath the seat frame and configured to selectively adjust a distance between the first and second seat bodies, includes an adjustor and first and second adjustable members coupled at the first and second seat bodies respectively and aligned with each other. The adjustor is linked with the first and second adjustable members and configured to be driven to rotate at a rotatable direction along a centerline of the adjustment channel to selectively adjust a width of the adjustment channel so as to selectively adjust the distance between the first and second seat bodies.

20 Claims, 16 Drawing Sheets

(56) References Cited

U.S. PATENT DOCUMENTS

| | | | | |
|---|---|---|---|---|
| 4,877,286 A * | 10/1989 | Hobson | ............... | B62J 1/002 |
| | | | | 297/452.4 |
| 5,123,698 A * | 6/1992 | Hodges | ............... | B62J 1/005 |
| | | | | 297/215.16 |
| 6,290,291 B1 * | 9/2001 | Kojima | ............... | B62J 1/10 |
| | | | | 297/452.4 |
| 6,402,236 B1 * | 6/2002 | Yates | ............... | B62J 1/10 |
| | | | | 297/201 |
| 7,104,600 B2 * | 9/2006 | Scholz | ............... | B62J 1/005 |
| | | | | 297/201 |
| 7,581,787 B2 * | 9/2009 | Livne | ............... | B62H 5/00 |
| | | | | 297/201 |
| 7,976,102 B2 * | 7/2011 | Chang | ............... | A47C 9/002 |
| | | | | 297/201 |
| 8,480,169 B2 * | 7/2013 | Bailie | ............... | B62J 1/10 |
| | | | | 297/202 |
| 10,118,658 B2 * | 11/2018 | Petty | ............... | B62J 1/08 |
| 10,750,872 B2 * | 8/2020 | Petty | ............... | B62J 1/10 |
| 11,503,915 B1 * | 11/2022 | Chang | ............... | A47C 7/024 |
| 2003/0038515 A1 * | 2/2003 | Martin | ............... | B62J 1/10 |
| | | | | 297/195.1 |
| 2008/0054689 A1 * | 3/2008 | Tucker | ............... | B62J 1/005 |
| | | | | 297/201 |
| 2008/0309130 A1 * | 12/2008 | Livne | ............... | B62J 1/08 |
| | | | | 297/215.1 |

\* cited by examiner

ADJUSTABLE SEAT FOR BICYCLE, EXERCISE MACHINE OR THE LIKE

CROSS REFERENCE OF RELATED APPLICATION

This application is a Continuation-In-Part application that claims the benefit of priority under 35 U.S.C. § 120 to a non-provisional application, application Ser. No. 17/067,626, filed Oct. 9, 2020, which is incorporated herewith by reference in its entirety.

BACKGROUND OF THE PRESENT INVENTION

Field of Invention

The present invention relates to a bicycle frame, and more particularly to an adjustable seat for bicycle, exercise machine or the like, which is able to selectively adjust a dimensional size of the bicycle seat to fittingly support a user.

Description of Related Arts

A bicycle saddle, also known as bicycle seat, is commonly attached to a seat post of a bicycle for enabling a rider to sit on the bicycle saddle. Generally speaking, there are two types of bicycle saddle, wherein one type is the performance saddle designed for road bikes and touring bikes, and another type is the cushioning saddle designed for recreational cycling and cruising. The bicycle saddle generally has a long narrow shape, wherein a rear portion of the bicycle saddle is enlarged to support the pelvis of the user so as to support the user's weight on the bicycle saddle when sitting on the bicycle saddle.

However, most of the users experience discomfort when sitting on the bicycle saddle, especially the performance saddle. Accordingly, when the user sits on the bicycle saddle, the body weight of the user will apply on a seat surface of the bicycle saddle. Due to the fixed contour of the seat surface of the bicycle saddle, different pressure points will be exerted to the user that causes the discomfort when sitting.

Some bicycle saddles are configured to alter the contour of the seat surface of the bicycle saddle for minimizing the pressure points to the user's body. Since the size of the bicycle saddle is universal, the bicycle saddle cannot fit different users with different body sizes. Accordingly, a wider bicycle saddle is needed when the user has a wider pelvis in order to enhance the comfort level of the bicycle saddle when sitting thereon. However, most of the bicycle saddles in market cannot be adjusted their width. Therefore, there is a need for a bicycle saddle that can satisfy different user preferences with respect to the gender and body shape of the users.

U.S. Pat. No. 6,290,291 discloses an adjustable concept of an adjustable bicycle saddle provided with a saddle base and first and second saddle portions that are movably coupled relative to the saddle base between at least two different locations to change the effective transverse width of the saddle. It attempts to allow the adjustable bicycle saddle to be adjusted to be wider or narrower to suit the desired riding style. However, this conventional structure of the adjustable bicycle saddle is not adapted for mass production and is not practically enabling since it fails to provide a rigid configuration to support the rider while riding, especially travelling off road. The first and second saddle portions are not well supported and mounted to the saddle base. The threaded shafts 56a, 56b integrally mounted to two sides of the control element 54, as disclosed in the '291 patent, are an elongated straight component which are straightly extended along the two rear recesses 48a, 48b respectively. There is no secure configuration for prevention of any movement of the control element 54 and the threaded shafts 56a, 56b after adjustment that is risky to the rider if the first and second saddle portions moves with respect to the saddle base during riding of the bicycle. Besides, the thread shafts 56a, 56b and the rear recesses 48a, 48b are coaxially extended during the sport mode as shown in FIG. 4 which is structurally reasonable but when the first and second saddle portions are in the city mode as shown in FIG. 5, each of the first and second saddle portions is pivotally move to an inclined manner and the two rear recesses 49a, 49b are also extended inclinedly so that it is so difficult to configure the straight threaded shafts 56a, 56b transversally extended in the slanted rear recesses 49a, 49b in a tight and rigid manner, especially for mass production, to avoid unnecessary vibration and shaking of the first and second saddle portions with respect to the saddle base that is not only risky in riding but also uncomfortable to the rider. Accordingly, the '291 patent may be enabled for a prototype but is not practical for a marketable product to provide safe and rigid configuration for the users. It is the main reason for there is no such product available in the market since the filing date of the '291 patent.

SUMMARY OF THE PRESENT INVENTION

The invention is advantageous in that it provides an adjustable seat for bicycle, exercise machine or the like, which is able to selectively adjust a dimensional size of the bicycle seat to fittingly support a user.

Another advantage of the invention is to provide an adjustable seat for bicycle, exercise machine or the like, wherein an overall width of the adjustable seat is selectively adjusted by adjusting a distance between two seat bodies by means of an adjustable assembly.

Another advantage of the invention is to provide an adjustable seat for bicycle, exercise machine or the like, wherein the adjustable assembly provides an adjustor configured below the seat bodies for selectively adjusting the distance between the two seat bodies.

Another advantage of the invention is to provide an adjustable seat for bicycle, exercise machine or the like, wherein the distance between two seat bodies can be selectively adjusted via a rotation of an adjustor which is located between the seat bodies.

Another advantage of the invention is to provide an adjustable seat for bicycle, exercise machine or the like, wherein the user is able to simply rotate the adjustor at one direction to reduce the overall width of the adjustable seat and at an opposite direction to increase the overall width of the adjustable seat.

Another advantage of the invention is to provide an adjustable seat for bicycle, exercise machine or the like, wherein the adjustor is driven to rotate in a tool-less manner, such that the user is able to selectively adjust the overall width of the adjustable seat without requiring any tool.

Another advantage of the invention is to provide an adjustable seat for bicycle, exercise machine or the like, wherein the seat bodies are concurrently moved to adjust the distance therebetween to enhance an adjusting operation of the adjustable seat in a stable manner.

Another advantage of the invention is to provide an adjustable seat for bicycle, exercise machine or the like, wherein the adjustable assembly includes a secure arrangement for securely locking the positions of the seat bodies after the seat bodies are adjusted to the desire positions.

Another advantage of the invention is to provide an adjustable seat for bicycle, exercise machine or the like, wherein the two seat bodies are able to be adjusted between at least a compact mode with the narrowest distance therebetween and an extension mode with the widest distance therebetween by means of the adjustable assembly of the adjustable seat.

Another advantage of the invention is to provide an adjustable seat for bicycle, exercise machine or the like, wherein a secure arrangement is provided to selectively lock the adjustable assembly to secure the positions of the seat bodies or unlock the adjustable assembly for operation to adjust the distance between the seat bodies.

Another advantage of the invention is to provide an adjustable seat for bicycle, exercise machine or the like, wherein a secure arrangement is provided for selectively locking the operation of the adjustor of the adjustable assembly to secure the positions of the seat bodies and unlocking the operation of the adjustor of the adjustable assembly to allow adjustment of the distance between the seat bodies.

Another advantage of the invention is to provide an adjustable seat for bicycle, exercise machine or the like, wherein a secure arrangement is provided to secure the movable elements of the adjustable assembly in a rigid manner to avoid unnecessary movement, vibration and/or shaking of the elements of the adjustable assembly with respect to each other so as to ensure a rigid and secure configuration of the adjustable seat after the seat bodies are adjusted to the desire positions through the adjustable assembly.

Another advantage of the invention is to provide an adjustable seat for bicycle, exercise machine or the like, wherein the pivotally movement of the seat bodies toward each other or away from each other is transmitted by means of a triangular linkage mechanism configured between the two seat bodies and the adjustor, that enables the seat bodies being adjusted in a balance, secure, smooth, and well supported manner and moving symmetrically and simultaneously with a minimum rotation force to the adjustor.

Another advantage of the invention is to provide an adjustable seat for bicycle, exercise machine or the like, wherein the transmission mechanism is equipped and incorporated with the secure arrangement such that the secure arrangement is capable of locking and securing the operation and movement of the transmission mechanism.

Another advantage of the invention is to provide an adjustable seat for bicycle, exercise machine or the like, wherein the adjustable assembly can be incorporated with any existing bicycle seat to selectively adjust the width thereof.

Another advantage of the invention is to provide an adjustable seat for bicycle, exercise machine or the like, which does not require to alter the original structural design of the bicycle seat, so as to minimize the manufacturing cost of the bicycle seat incorporating with the adjustable assembly.

Another advantage of the invention is to provide an adjustable seat for bicycle, exercise machine or the like, which allows the manufacturer of the bicycle, exercise machine or the like to custom make the saddle thereof according to the body size of the user who orders the specific the bicycle, exercise machine or the like during production thereof.

Another advantage of the invention is to provide an adjustable seat for bicycle, exercise machine or the like, wherein no expensive or complicated structure is required to employ in the present invention in order to achieve the above mentioned objects. Therefore, the present invention successfully provides an economic and efficient solution for selectively adjusting the size of the bicycle seat and for enhancing a rigid configuration for the bicycle seat.

Additional advantages and features of the invention will become apparent from the description which follows, and may be realized by means of the instrumentalities and combinations particular point out in the appended claims.

According to the present invention, the foregoing and other objects and advantages are attained by an adjustable seat for bicycle, exercise machine or the like, comprising:

a seat frame comprising a first seat body and a second seat body spaced apart each other to define an adjustment channel between the first and second seat bodies; and an adjustable assembly, supported underneath the seat frame and configured to selectively adjust a distance between the first and second seat bodies, comprising:

a first adjustable member and a second adjustable member coupled at the first and second seat bodies respectively and aligned with each other; and an adjustor linked with the first and second adjustable members, wherein the adjustor is configured to be driven to rotate at a rotatable direction along a centerline of the adjustment channel to selectively adjust a width of the adjustment channel so as to selectively adjust the distance between the first and second seat bodies.

In one embodiment, the seat frame further comprises a pivot joint pivotally coupling front end portions of the first and second seat bodies with each other such that rear end portions of the first and second seat bodies are capable of moving apart each other about the pivot joint to adjust a wide of the adjustment channel, wherein the adjustor is coupled with the first and second adjustable members through an incorporation of a guiding device and a transmission mechanism.

In one embodiment, the first adjustable member and the second adjustable member can be fixedly mounted to first and second bottom sides of the first and second seat bodies respectively and have a first sliding slot and a second sliding slot respectively which are extended in arc shape and aligned with each other with a same radius about the pivot joint.

In one embodiment, the first and second adjustable members are extension members downwardly extended from the bottom rigid surfaces of the first and second seat bodies.

In one embodiment, the adjustable assembly comprises a retention frame having one end coupled with the pivot joint and a rear end coupled with the guiding device for supporting the first and second seat bodies on top thereof and allowing the first and second seat bodies to selectively adjust the overall width of the seat frame through an adjustable mechanical linkage of the transmission mechanism.

In one embodiment, the retention frame comprises two retention arms which front ends are integrally connected to form a front portion configured to couple with the pivot joint, wherein rear ends of the retention arms are extended to securely couple with the adjustable assembly.

In one embodiment, the adjustable assembly further comprises two retention bases coupled with the two rear ends of the two retention arms of the retention frame.

In one embodiment, the guiding device of the adjustable assembly comprises:

a guiding member having a predetermined curvature and two guiding arms symmetrically extended to slidably couple with the first adjustable member and the second adjustable member respectively; and a retention member, having the same curvature of the guiding member, disposed between the guiding member and the two retention bases and configured to support the guiding member thereon in position and have two end wings extended underneath the rear portions of the first and second seat bodies of the seat frame, wherein the two retention bases are fastened to the two end wings respectively, such that the retention frame, which is adapted to be mounted to a saddle post of the bicycle, exercise machine or the like, substantially support the seat frame through the pivot joint and the guiding device, such that the first and second seat bodies are capable of rotating about the pivot joint to selectively move towards each other to reduce the width of the adjustment channel or apart each other to increase the width of the adjustment channel while the guiding member guiding movements of the first and second seat bodies by sliding the first and second adjustable members along the two guiding arms of the guiding member respectively.

In one embodiment, the adjustable assembly further comprises a secure arrangement for securely locking the positions of the first and second seat bodies after the first and second seat bodies are adjusted to the desired positions.

In one embodiment, the secure arrangement is configured to be operated to selectively apply a pressing force against the guiding member to stop any movement of the first and second seat bodies.

In one embodiment, the transmission mechanism of the adjustable assembly comprises a linear link element, having a driving end and an adjusting end, movably supported by the retention member, and a pair of first and second transverse link elements each having a seat end and a driven end, wherein the driven ends of the first and second transverse link elements are pivotally connected with the driving end of the linear link element along a driving axle and the seat ends of the first and second transverse link elements are pivotally connected to the first and second seat bodies respectively, such that pulling the adjusting end of the linear link element rearwards will drive the first and second transverse link elements to rotate about the driving axle to move towards each other so as to drive the first and second seat bodies to rotate towards each other about the pivot joint to reduce the width of the adjustment channel until the adjustable seat is in a compact mode, and that pushing the adjusting end of the linear link element will drive the first and second transverse link elements to rotate about the driving axle to move apart each other so as to drive the first and second seat bodies to rotate apart each other about the pivot joint to increase the width of the adjustment channel until the adjustable seat is in an extension mode.

In one embodiment, the adjustor is rotatably coupled with the adjusting end of the linear link element such that a rotation of the adjustor in different directions would substantially push or pull the linear link element to move frontward or rearward along an axis thereof so as to drive the first and second transverse link elements as well as the first and second seat bodies to move to desire positions correspondingly.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE FIRST PREFERRED EMBODIMENT

Figure 1:
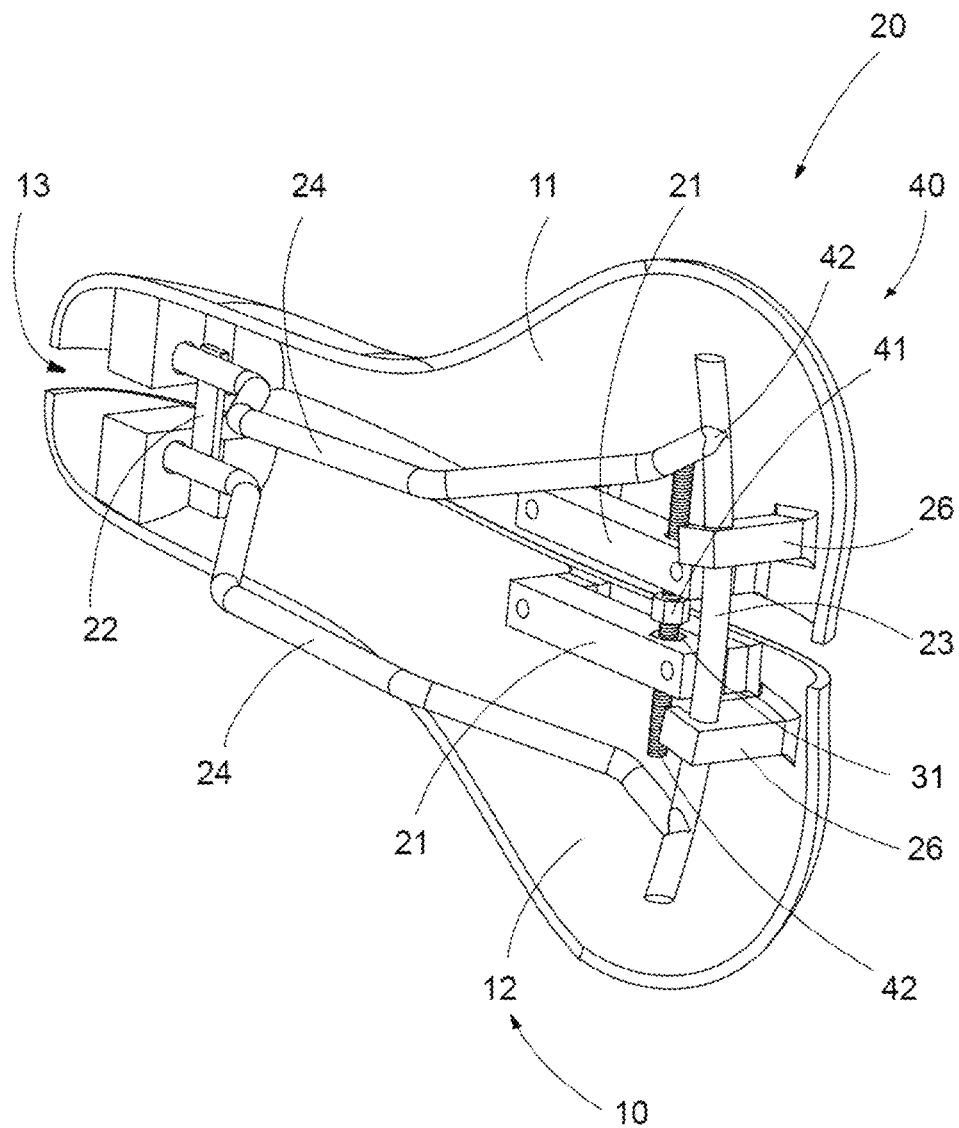
FIG. 1 is a perspective view of an adjustable seat for bicycle, exercise machine or the like according to a first preferred embodiment of the present invention.
Figure 2:
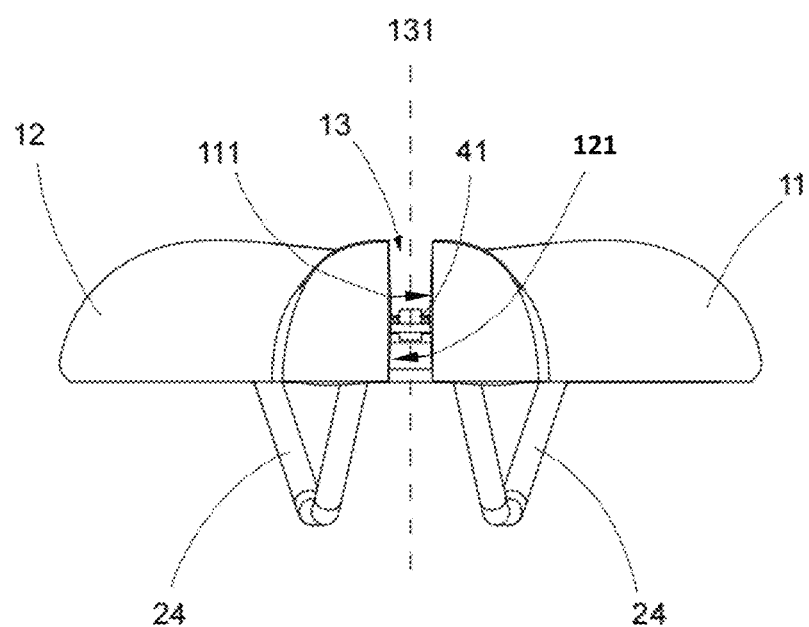
FIG. 2 is a front view of the adjustable seat according to the above first preferred embodiment of the present invention.
Figure 3:
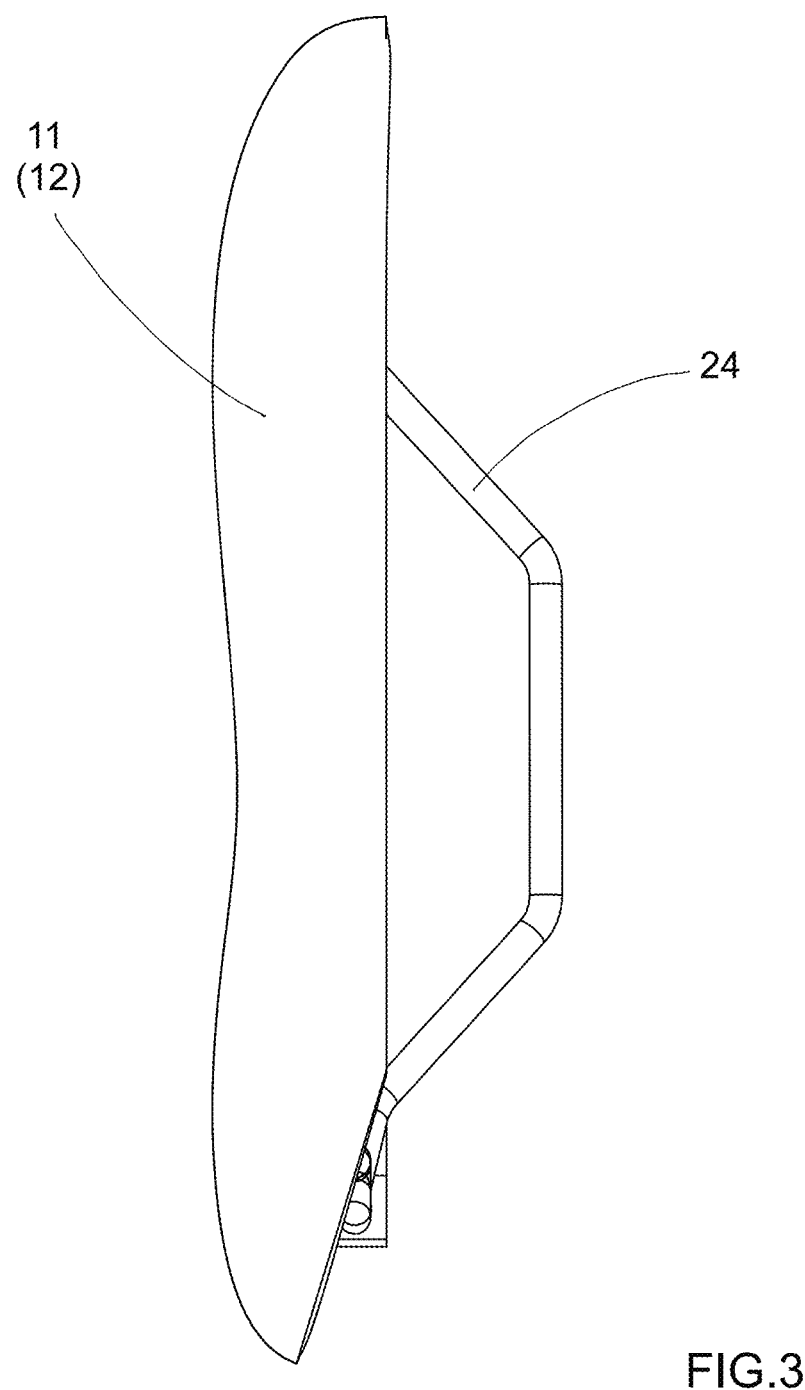
FIG. 3 is a side view of the adjustable seat according to the above first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 4 of the present invention, an adjustable seat for bicycle, exercise machine or the like according to a first preferred embodiment of the present invention is illustrated, wherein the adjustable seat is adapted for detachably coupling to the bicycle via a seat post assembly thereof. The adjustable seat of the present invention comprises a seat frame 10 for a user or a rider sitting thereon, and an adjustable assembly 20 supported underneath the seat frame 10.

The seat frame 10 comprises a first seat body 11 and a second seat body 12 spaced apart each other to define an adjustment channel 13 between the first and second seat bodies 11, 12. In the first preferred embodiment, the first and second seat bodies 11, 12 are embodied as left and right seat bodies respectively, wherein the adjustment channel 13 forms a middle channel between the left and right seat bodies. It should be appreciated that the first and second seat bodies 11, 12 can be front and rear seat bodies or top and bottom seat bodies.

According to the first preferred embodiment, the first and second seat bodies 11, 12 are identical and symmetrical along the adjustment channel 13, wherein each of the first and second seat bodies 11, 12 generally has a triangular shape. Each of the first and second seat bodies 11, 12 has a top cushioning surface and a bottom rigid surface. Each of the first and second seat bodies 11, 12 further has a straight inner edge 111, 121, wherein the adjustment channel 13 is formed between the straight inner edges 111, 121 of the first and second seat bodies 11, 12.

Figure 5:
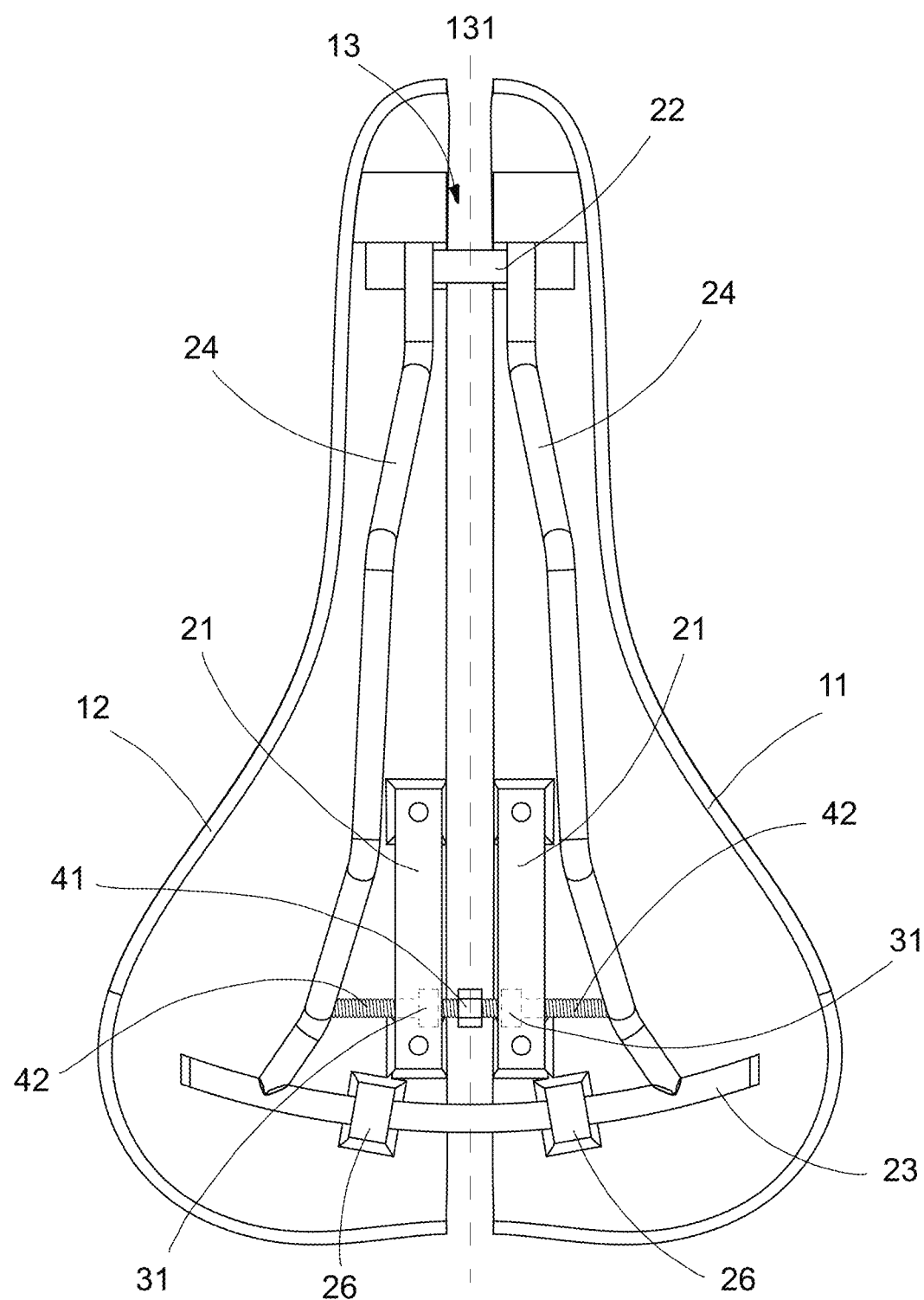
FIG. 5 is a bottom view of the adjustable seat at a first position according to the above first preferred embodiment of the present invention.
Figure 6:
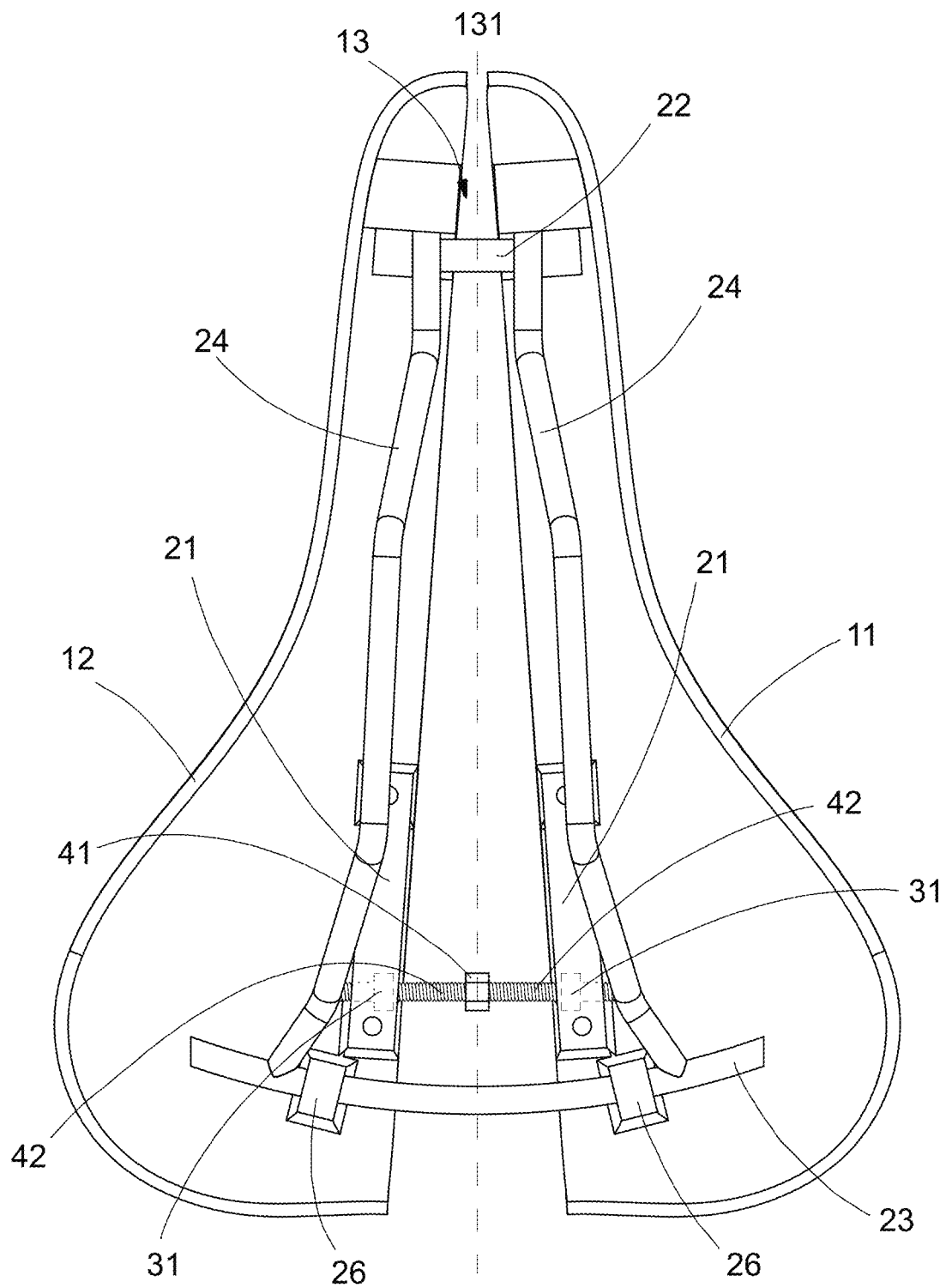
FIG. 6 is a bottom view of the adjustable seat at a second position according to the above first preferred embodiment of the present invention.

In the first preferred embodiment, the adjustment channel 13 defines a centerline 131 which is also a centerline of the seat frame 10 between the first and second seat bodies 11, 12. A width of the adjustment channel 13 is selectively adjusted by the adjustable assembly 20 to selectively adjust a distance between the first and second seat bodies 11, 12 to selectively shift the seat frame 10 between a first position as shown in FIG. 5 and a second position as shown in FIG. 6. As shown in FIG. 5, when reducing the width of the adjustment channel 13, the distance between the first and second seat bodies 11, 12 is correspondingly decreased. Likewise, when increasing the width of the adjustment channel 13, the distance between the first and second seat bodies 11, 12 is correspondingly increased as shown in FIG. 6. In one embodiment, the first position of the seat frame 10 is an original seat position and the second position of the seat frame 10 is an extended seat position.

As shown in FIGS. 1 to 4, the adjustable assembly 20 is supported underneath the seat frame 10 and configured for selectively adjusting the distance between the first and second seat bodies 11, 12. The adjustable assembly 20 comprises an adjustable means 30, which comprises at least two adjustable members 31, and an adjustor 40.

The adjustable members 31 are coupled at the first and second seat bodies 11, 12 respectively and aligned with each other. Preferably, the adjustable members 31 are coupled at the first and second seat bodies 11, 12 at rear-portions thereof respectively where the distance between the first and second seat bodies 11, 12 to be desirably adjusted.

The adjustor 40 is rotatably coupled with the adjustable members 31, preferably between the adjustable members 31, wherein the adjustor 40 is driven to rotate at a rotatable direction along the centerline 131 of the adjustment channel 13 to selectively adjust the width of the adjustment channel 13 so as to selectively adjust the distance between the first and second seat bodies 11, 12. Accordingly, the adjustor 40 has a disc portion that an axle of the adjustor 40 is perpendicular to the centerline 131 of the adjustment channel 13. It is worth mentioning that the axle of the adjustor 40 is defined as a rotatable axle of the disc portion of the adjustor 40, such that the disc portion of the adjustor 40 is rotatable along the centerline 131 of the adjustment channel 13. An uppermost point of the adjustor 40 is located below the top side of each of the first and second seat bodies 11, 12, such that any portion of the adjustor 40 will not protruded above the top side of each of the first and second seat bodies 11, 12 where the user sits thereon.

According to the first preferred embodiment, when the adjustor 40 is rotated at one direction to concurrently rotate the adjustable members 31, the distance between first and second seat bodies 11, 12 is reduced. When the adjustor 40 is rotated at an opposed direction to concurrently rotate the adjustable members 31, the distance between first and second seat bodies 11, 12 is increased.

Figure 4:
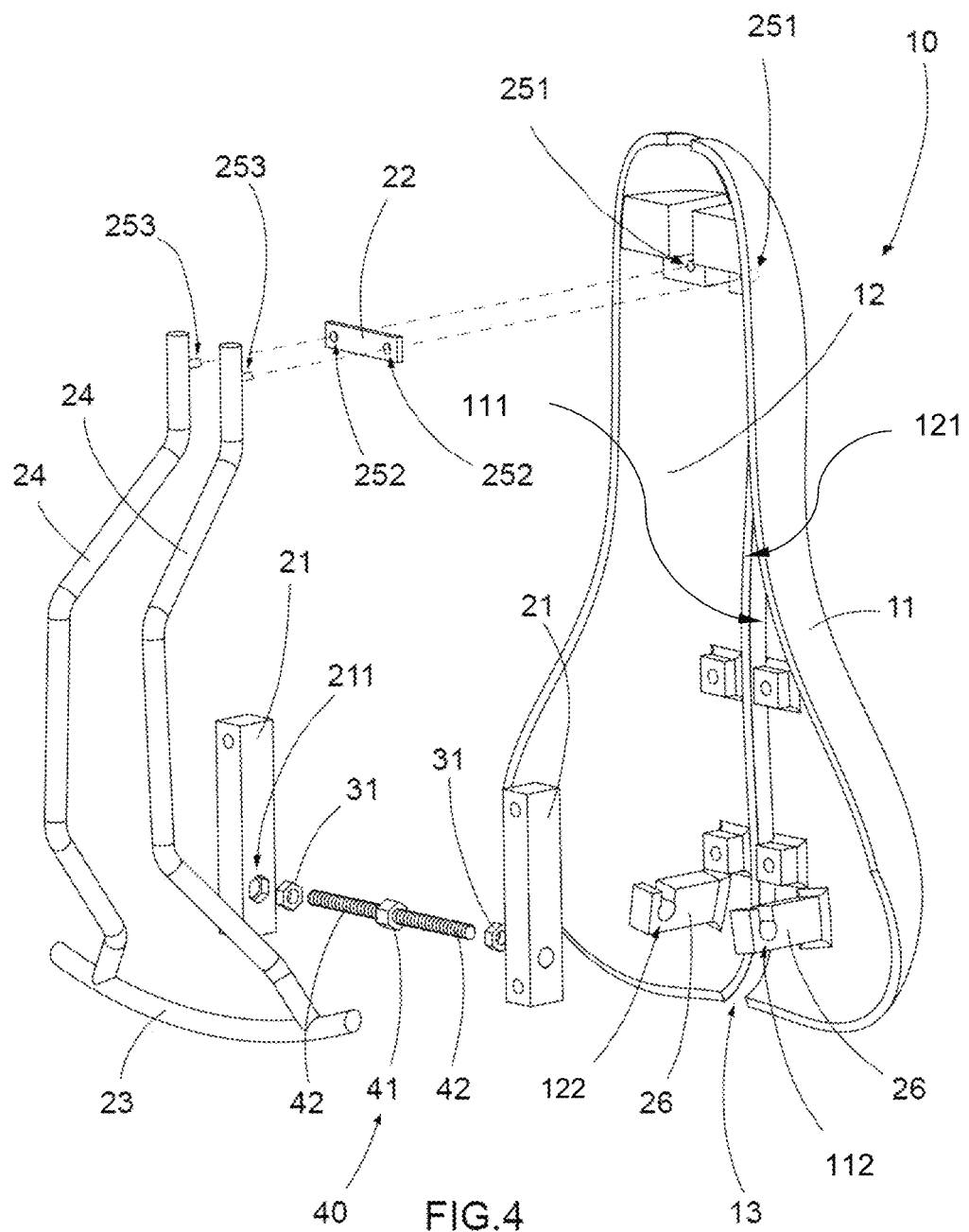
FIG. 4 is an exploded perspective view of the adjustable seat according to the above first preferred embodiment of the present invention.
Figure 7:
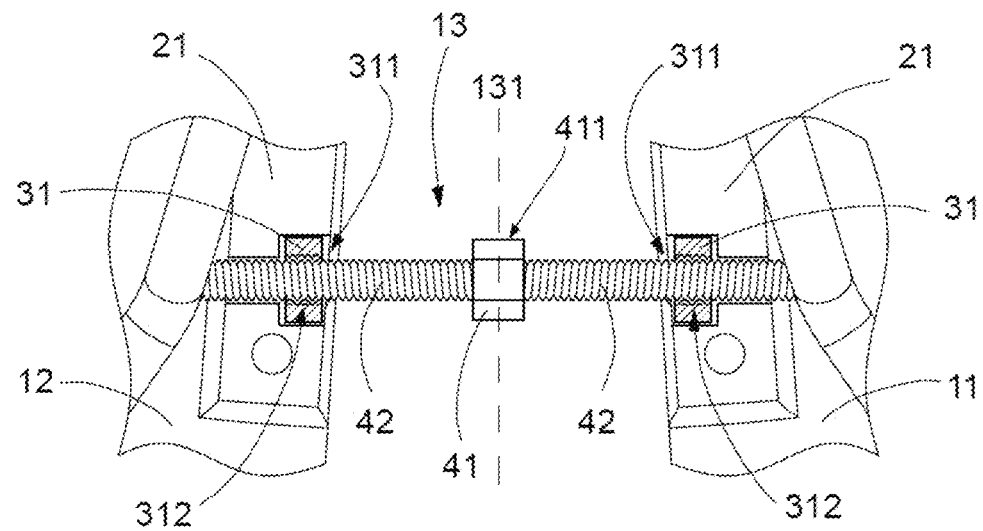
FIG. 7 illustrates an adjustable assembly of the adjustable seat according to the above first preferred embodiment of the present invention.

As shown in FIGS. 4 and 7, each of the adjustable members 31 is embodied as a threaded sleeve 31 having a side opening end 311 and a threaded inner wall 312, wherein the threaded sleeves 31 are coupled at the first and second seat bodies 11, 12 respectively, such that a distance between the threaded sleeves 31 is correspondingly adjusted in response to the width of the adjustment channel 13. Accordingly, the threaded sleeves 31 are aligned with each other at a position that the side opening ends 311 of the threaded sleeves 31 are coaxially aligned with each other. The threaded sleeves 31 are supported in a non-rotatable manner, such that the threaded sleeves 31 will not be driven to rotate when the adjustor 40 is rotated.

Correspondingly, the adjustor 40 comprises an adjusting wheel 41 and two threaded shafts 42 coaxially and opposedly extended from the adjusting wheel 41 to rotatably engage with the threaded inner walls 312 of the threaded sleeves 31 via the side opening ends 311 thereof. Therefore, when the adjusting wheel 41 is rotated, the threaded sleeves 31 are sidewardly moved in a synchronized manner to selectively adjust the width of the adjustment channel 13 so as to selectively adjust the distance between the first and second seat bodies 11, 12.

The adjusting wheel 41 is defined as the disc portion of the adjustor 40 to be driven to rotate. In one embodiment, the adjusting wheel 41 has a non-circular configuration and forms a polygonal configuration to have a plurality of user finger manipulating surfaces 411 being actuated to rotate the adjustor 40 in a tool-less manner. In other words, the user is able to rotate the adjusting wheel 41 by hand without any tool to adjust the distance between the first and second seat bodies 11, 12.

As shown in FIGS. 4 and 7, the threaded shafts 42 are coaxially extended from the adjusting wheel 41 and are perpendicular to the centerline 131 of the adjustment channel 13. Preferably, the threaded shafts 42 are integrally extended from the adjusting wheel 41 at the opposite directions, such that the threaded shafts 42 are coaxially aligned with each other. In other words, inner ends of the threaded shafts 42 are integrally extended from two sides of the adjusting wheel 41 respectively and outer ends of the threaded shafts 42 are extended to engage with the threaded inner walls 312 of the threaded sleeves via the side opening ends 311 thereof respectively. Therefore, when the adjusting wheel 41 is rotated, the threaded shafts 42 are driven to rotate correspondingly. Via the threaded engagement between the threaded shafts 42 and the threaded sleeves 31, the threaded shafts 42 are driven to rotatably slide in the threaded sleeves 31 respectively. When the outer ends of the threaded shafts 42 are slid toward the side opening ends 311 of the threaded sleeves 31, i.e. a direction toward the adjusting wheel 41, the distance between the threaded sleeves 31 is increased, such that the width of the adjustment channel 13 is correspondingly increased. Likewise, when the outer ends of the threaded shafts 42 are slid away from the side opening ends 311 of the threaded sleeves 31, i.e. a direction away from the adjusting wheel 41, a distance between the threaded sleeves 31 is reduced, such that the width of the adjustment channel 13 is correspondingly reduced.

In order to move the threaded sleeves 31 in a synchronized manner, threads of the threaded shafts 42 are extended in opposite spiral directions. Correspondingly, threads of the threaded inner walls 312 of the threaded sleeves 31 are extended in opposite spiral directions. Therefore, when the adjusting wheel 41 is rotated in one direction, the threaded sleeves 31 are concurrently moved toward the adjusting wheel 41 to reduce the distance between the first and second seat bodies 11, 12. When the adjusting wheel 41 is rotated at an opposed direction, the threaded sleeves 31 are concurrently moved away from the adjusting wheel 41 to increase the distance between the first and second seat bodies 11, 12.

As shown in FIGS. 4 to 7, the adjustable assembly 20 further comprises two retention members 21 affixed to the first and second seat bodies 11, 12 respectively. Accordingly, each of the retention members 21 has an elongated block configuration, wherein the retention members 21 are affixed at the bottom rigid surfaces of the first and second seat bodies 11, 12 respectively. Accordingly, the threaded sleeves 31 are embedded in the retention members 21 respectively to prevent rotatable movements thereof when the adjusting wheel 41 is rotated. Each of the retention members 21 has a retention slot 211 formed at an inner surface thereof, wherein the threaded sleeve 31 is received in the retention slot 211 of the retention member 21. Each of the threaded sleeve 31 has a non-circular shape and the retention slot has the corresponding non-circular configuration, such that when the threaded sleeve 31 is received in the retention slot of the retention member 21, the threaded sleeve 31 cannot not rotate when the adjustor 40 is driven to rotate. Each of the retention members 21 further has a through hole formed at an outer surface thereof to communicate with the retention slot 211, wherein the outer ends of the threaded shafts 42 can slidably extend through the through hole when the threaded shafts 42 are rotatably slid through the threaded sleeves 31.

Figure 8:
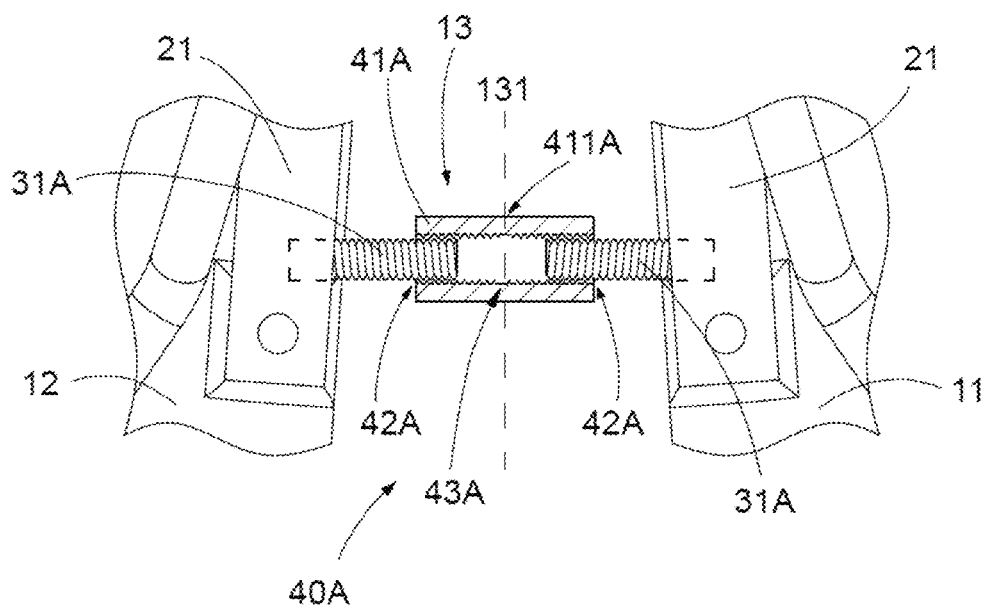
FIG. 8 illustrates an alternative mode of the adjustable assembly of the adjustable seat according to the above first preferred embodiment of the present invention.

FIG. 8 illustrates an alternative mode of the adjustable members 31A and the adjustor 40A. Accordingly, each of the adjustable members 31A is embodied a threaded shaft 31A, wherein the threaded shafts 31A are extended from the first and second bodies 11, 12 to the adjustment channel 13 and are aligned with each other end-to-end. Particularly, the threaded shafts 31A are affixed to the retention members 21 respectively, such that the threaded shafts 31A are supported in a non-rotatable manner. Therefore, outer ends of the threaded shafts 31A are embedded in the retention members 21 respectively and inner ends of the threaded shafts 31A are extended to the adjustment channel 13.

The adjustor 40A comprises a tubular adjusting wheel 41A having two side opening ends 42A and a threaded inner wall 43A, wherein the adjusting wheel 41A is defined as the disc portion of the adjustor 40A. The adjusting wheel 41A is supported within the adjustment channel 13 and is perpendicular to the centerline 131 of the adjustment channel 13. The adjusting wheel 41A has a non-circular configuration and forms a polygonal configuration to have a plurality of user finger manipulating surfaces 411A being actuated to rotate the adjustor 40A in a tool-less manner.

The threaded shafts 31A are engaged with the threaded inner walls 43A of the adjusting wheel 41A via the side opening ends 42A thereof, such that when the adjusting wheel 41A is rotated, the threaded shafts 31A are sidewardly moved in a synchronized manner to selectively adjust the width of the adjustment channel 13 so as to selectively adjust the distance between the first and second seat bodies 11, 12. In other words, when the adjusting wheel 41A is rotated at one direction, the outer ends of the threaded shaft 31A are slid within the adjusting wheel 41 and are slid toward each other so as to reduce the width of the adjustment channel 13. When the adjusting wheel 41A is rotated at an opposed direction, the outer ends of the threaded shaft 31A are slid within the adjusting wheel 41 and are slid away from each other so as to increase the width of the adjustment channel 13.

In order to move the threaded shafts 31A in a synchronized manner, the adjusting wheel 41A has two threads formed at the threaded inner wall 43A. The threads of the threaded inner wall 43A of the adjusting wheel 41A are extended from the two side opening ends 42A in opposite spiral directions. Correspondingly, threads of the thread shafts 31A are extended in opposite spiral directions. Therefore, when the adjusting wheel 41A is rotated at one direction, the threaded shafts 31A are concurrently moved toward the adjusting wheel 41A to reduce the distance between the first and second seat bodies 11, 12. When the adjusting wheel 41A is rotated at an opposed direction, the threaded shafts 31A are concurrently moved away from the adjusting wheel 41A to increase the distance between the first and second seat bodies 11, 12. In other words, when the adjusting wheel 41A is rotated at one direction, the threaded shafts 31A are concurrently slid within the adjusting wheel 41A at a position that the outer ends of the threaded shafts 31A are moved away from each other to increase the distance between the first and second seat bodies 11, 12. When the adjusting wheel 41A is rotated at the opposed direction, the threaded shafts 31A are concurrently slid within the adjusting wheel 41A at a position that the outer ends of the threaded shafts 31A are moved toward each other to reduce the distance between the first and second seat bodies 11, 12.

As shown in FIGS. 1 and 4 to 6, the adjustable assembly 20 further comprises a control arm 22 and a guiding arm 23 spaced apart from each other and coupled between the first and second seat bodies 11, 12 to across the adjustment channel 13. Accordingly, the control arm 22 is affixed between the first and second seat bodies 11, 12 to retain the width of the adjustment channel 13. The guiding arm 23 is slidably coupled between the first and second seat bodies 11, 12 to selectively adjust the width of the adjustment channel 13. In other words, when the adjustor 40 is rotated, the control arm 22 retains the width of the adjustment channel 13 while the guiding arm 23 is slid between the first and second seat bodies 11, 12 to adjust the width of the adjustment channel 13.

According to the first preferred embodiment, the control arm 22 and the guiding arm 23 are coupled at front portions and rear portions of the first and second seat bodies 11, 12, wherein the adjustor 40 is located between the control arm 22 and the guiding arm 23 to ensure the distance between the first and second seat bodies 11, 12 being adjusted stably. When the adjustor 40 is rotated, the width of the adjustment channel 13 at the front portions of first and second seat bodies 11, 12 is remained unchanged via the control arm 22. At the same time, the width of the adjustment channel 13 at the rear portions of first and second seat bodies 11, 12 is selectively adjusted and is guided via the sliding movement of the guiding arm 23. Furthermore, a length of the control arm 22 is shorter than a length of the guiding arm 23, such that the width of the adjustment channel 13 at the rear portions of first and second seat bodies 11, 12 can be maximized via the length of the guiding arm 23. Since the width of the adjustment channel 13 at the front portions of first and second seat bodies 11, 12 is fixed, the control arm 22 has an elongated straight configuration, wherein two ends of the control arm 22 are affixed to the first and second seat bodies 11, 12 respectively. For guiding the width adjustment of the adjustment channel 13 at the rear portions of first and second seat bodies 11, 12, the guiding arm 23 has an elongated curved configuration, such that the rear portions of first and second seat bodies 11, 12 are guided to move along a curvature of the guiding arm 23.

Accordingly, each of the first and second seat bodies 11, 12 has a sliding slot 112, 122 slidably engaging with two end portions the guiding arms 23 respectively. As shown in FIG. 4, each of the first and second seat bodies 11, 12 comprises an extension member 26 downwardly extended from the bottom rigid surface thereof, wherein the sliding slots 112, 122 are formed at the extension members 26 of the first and second seat bodies 11, 12 respectively.

The adjustable assembly 20 further comprises two retention arms 24 supported underneath the first and second seat bodies 11, 12 respectively, wherein the control arm 22 and the guiding arm 23 are coupled to the retention arms 24 to enhance a rigid configuration of each of the first and second seat bodies 11, 12.

As shown in FIGS. 4 to 6, each of the retention arms 24 has a first end and an opposed second end, wherein the first and second ends of the retention arm 24 are shown as front and rear ends thereof. The two first ends, i.e. the front ends, of the retention arms 24 are pivotally coupled at two ends of the control arm 22 and are pivotally coupled to the first and second seat bodies 11, 12 via a pivot joint respectively. As shown in FIG. 4, the pivot joint comprises a pivot slot 251 formed at each of the first and second seat bodies 11, 12, a through slot 252 formed at each end of the control arm 22, and a pivot shaft 253 protruded from the front end of each of the retention arms 24. The pivot shaft 253 is extended through the through slot 252 and is pivotally engaged with the pivot slot 251 so as to pivotally couple the front ends of the retention arms 24 with the first and second seat bodies 11, 12 via the control arm 22.

The two second ends, i.e. the rear ends, of the retention arms 24 are affixed to two end portions of guiding arms 23, wherein the sliding slots 112, 122 are located between the two rear ends of the retention arms 24 to enhance the sliding stabilization of the first and second seat bodies 11, 12 along the guiding arm 23.

In order to selective adjust the overall width of the seat frame 10, the user is able to actuate the adjustor 40 in order to rotate the adjustor 40 for selectively adjusting the distance between the first and second seat bodies 11, 12. At the first position of the seat frame 10, i.e. the original position of the seat frame 10, as shown in FIG. 5, the width of the adjustment channel 13 is uniform, such that the distance between the front portions of the first and second seat bodies 11, 12 is the same as the distance between the rear portions of the first and second seat bodies 11, 12. When the adjusting wheel 41 is rotated at one direction to drive the threaded sleeves 31 rotatably sliding toward each other along the threaded shafts 42, the first and second seat bodies 11, 12 are moved to its first position, i.e. the original position, as shown in FIG. 5. At the first position of the seat frame 10, the width of the adjustment channel 13 is uniform. When the adjusting wheel 41 is rotated at the opposite direction to drive the threaded sleeves 31 rotatably sliding away from each other along the threaded shafts 42, the first and second seat bodies 11, 12 are moved to its second position, i.e. the extended position, as shown in FIG. 6. At the second position of the seat frame 10, the width of the adjustment channel 13 is gradually increased from front to rear. In other words, the distance between the front portions of the first and second seat bodies 11, 12 is shorter than the distance between the rear portions of the first and second seat bodies 11, 12.

Referring to FIGS. 9 to 17B of the drawings, a second preferred embodiment of the adjustable seat for bicycle, exercise machine or the like according to the present invention is illustrated, wherein the adjustable seat is adapted for detachably coupling to the bicycle via a seat post assembly thereof. The adjustable seat of the present invention comprises a seat frame 10' for a user or a rider sitting thereon, and an adjustable assembly 20' supported underneath the seat frame 10'.

The seat frame 10' comprises a first seat body 11' and a second seat body 12' spaced apart each other to define an adjustment channel 13' between the first and second seat bodies 11', 12'. In the second preferred embodiment, the first and second seat bodies 11', 12' are embodied as left and right seat bodies respectively, wherein the adjustment channel 13' forms a middle channel defined between the left and right seat bodies 11', 12'. It should be appreciated that the first and second seat bodies 11', 12' can be front and rear seat bodies or top and bottom seat bodies.

Figure 10:
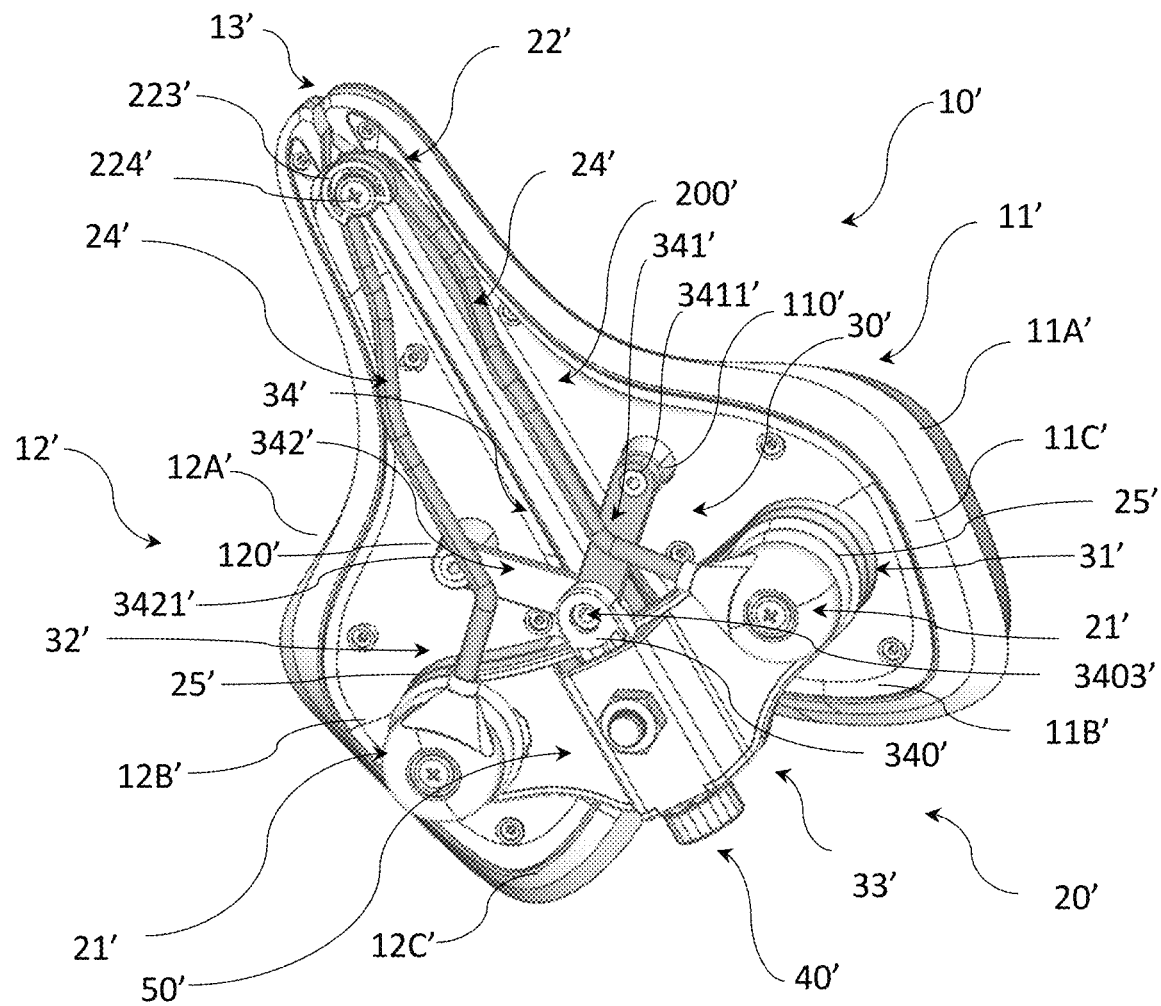
FIG. 10 is a bottom perspective view of the adjustable seat according to the above second preferred embodiment of the present invention.
Figure 14:
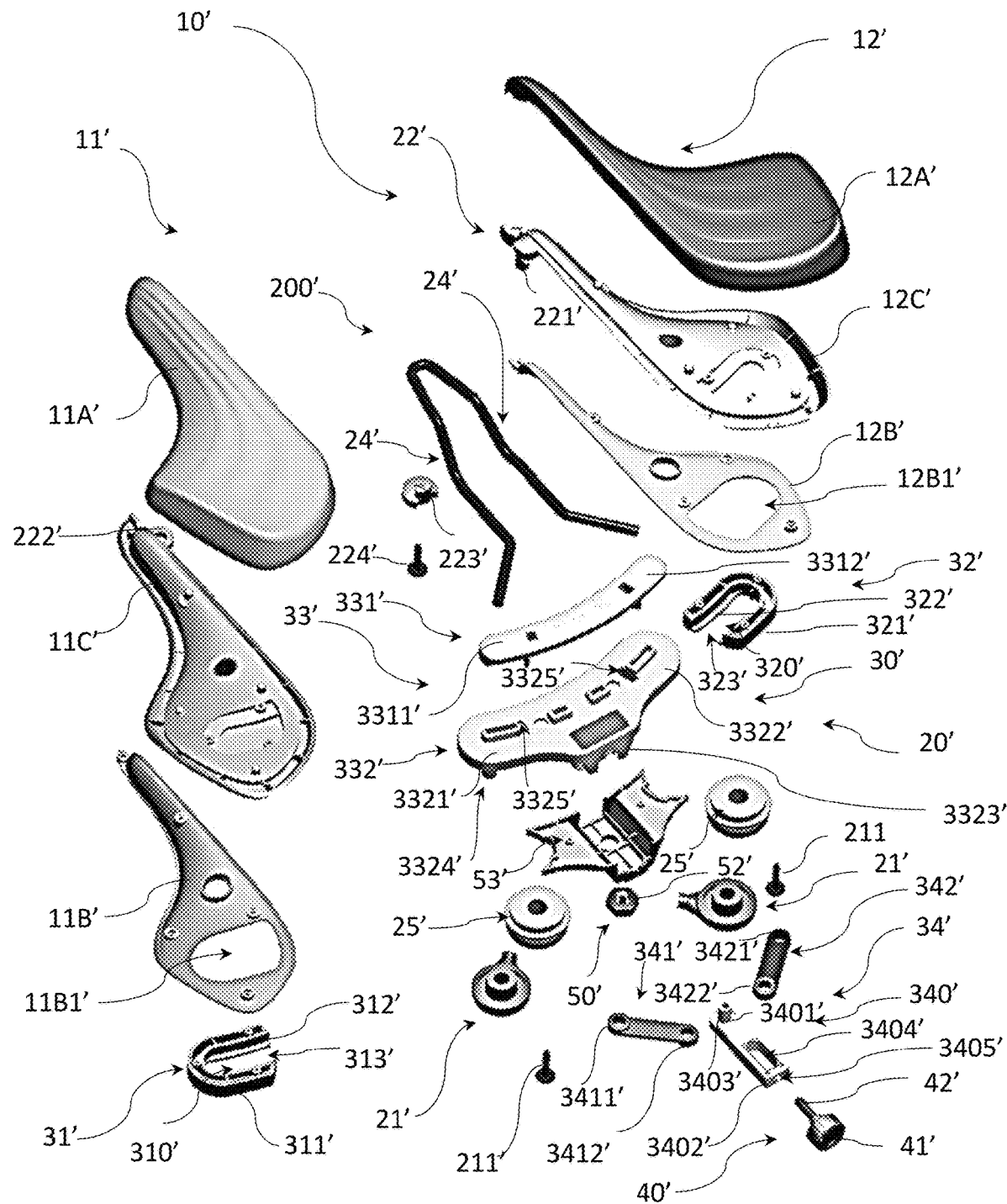
FIG. 14 is an exploded view of the adjustable seat according to the above second preferred embodiment of the present invention.

According to the second preferred embodiment, the first and second seat bodies 11', 12' are identical and symmetrical along the adjustment channel 13', wherein each of the first and second seat bodies 11', 12' generally has a triangular shape. Each of the first and second seat bodies 11', 12' has a top cushion layer 11A', 12A' having a top cushioning surface, a bottom cover layer 11B', 12B' having a bottom rigid surface, and a main frame layer 11C', 12C' mounted between the top cushion layer 11A', 12A and the bottom cover layer 11B', 12B', which is rigid and strengthen enough to support the weight of the rider and rigidly mount the adjustable assembly 20' underneath, as shown in FIGS. 10 and 14. Each of the first and second seat bodies 11', 12' further has a straight inner edge 111', 121', wherein the adjustment channel 13' is formed between the straight inner edges 111', 121' of the first and second seat bodies 11', 12'.

Figure 9:
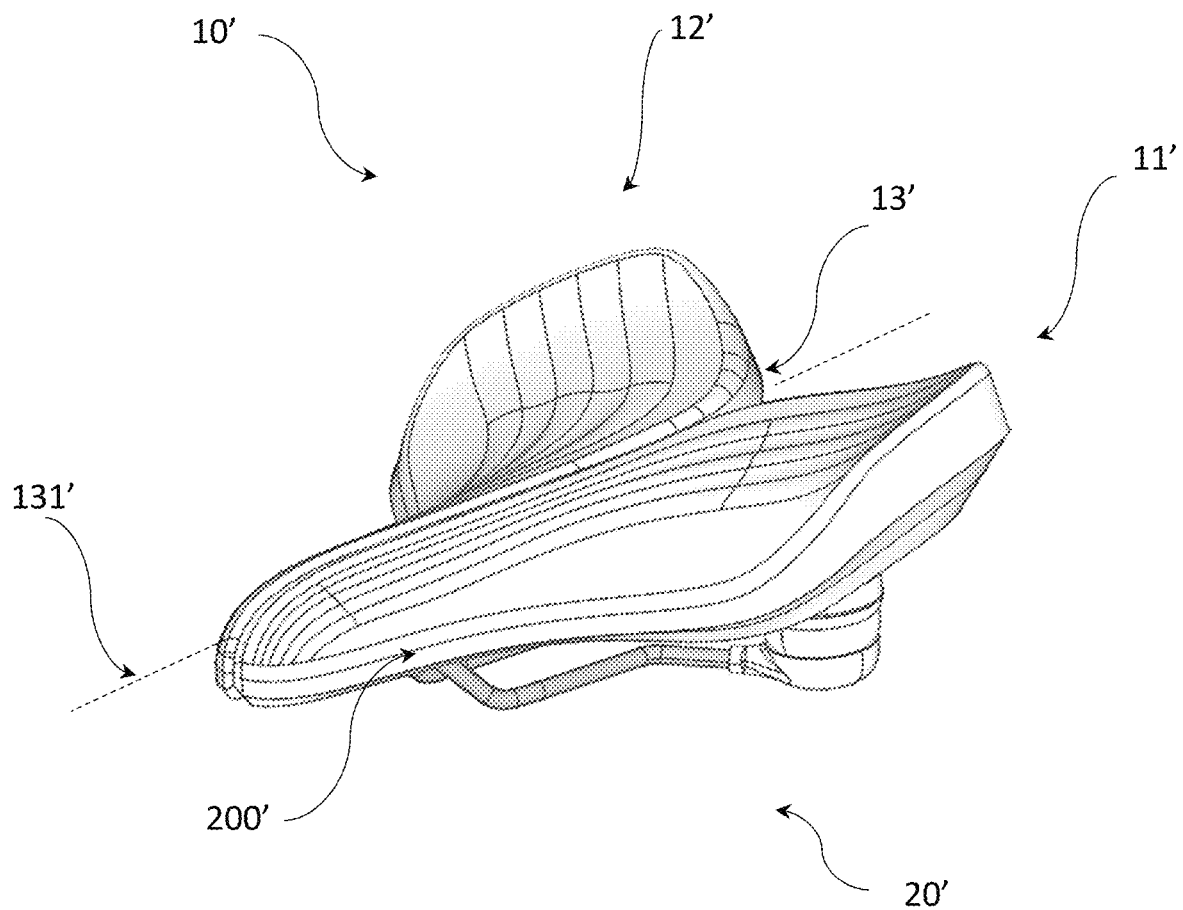
FIG. 9 is a perspective view of an adjustable seat for bicycle, exercise machine or the like according to a second preferred embodiment of the present invention.
Figure 12A:
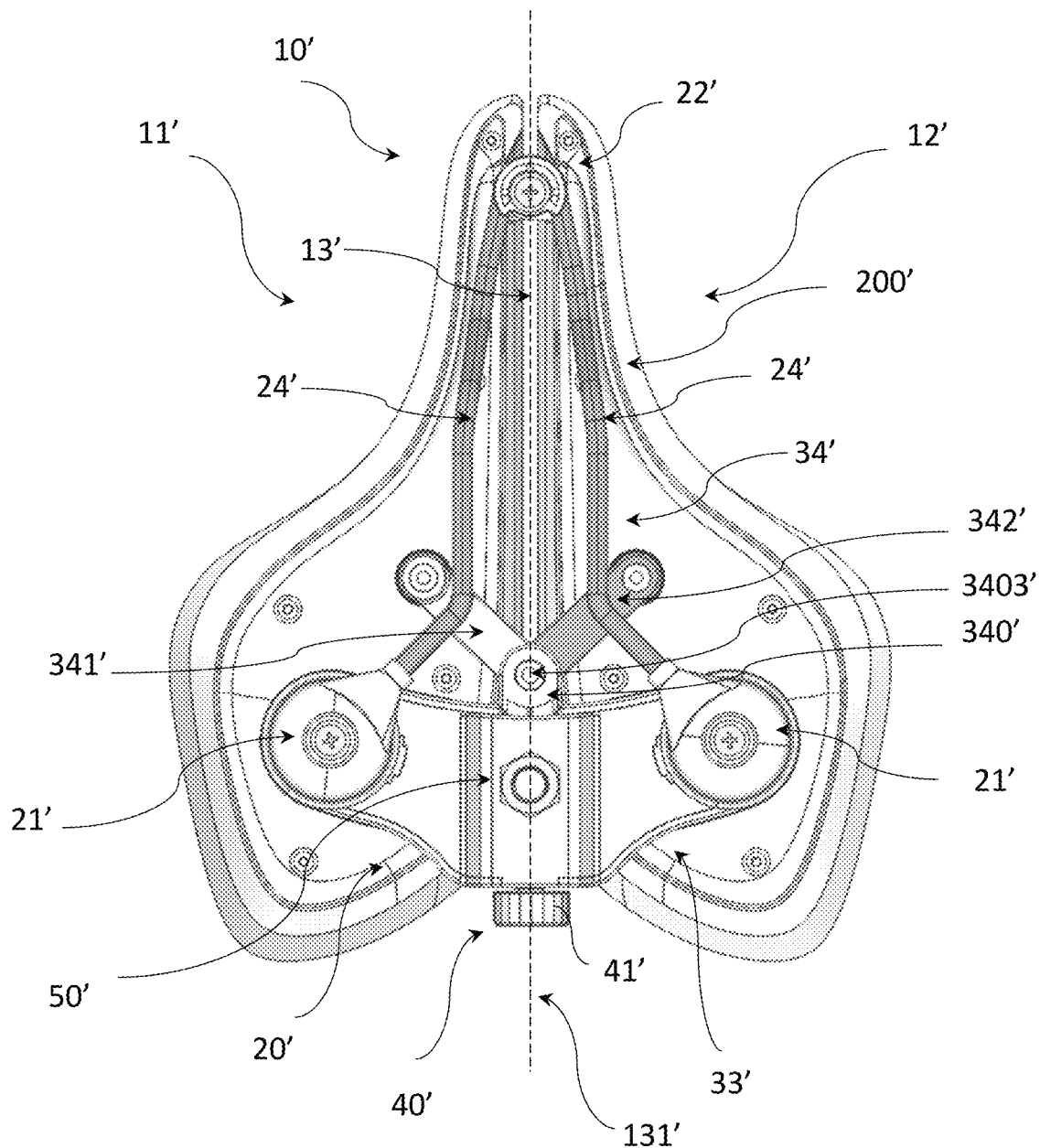
FIG. 12A is a bottom view of the adjustable seat according to the above preferred embodiment of the present invention, illustrating the compact mode thereof.
Figure 12B:
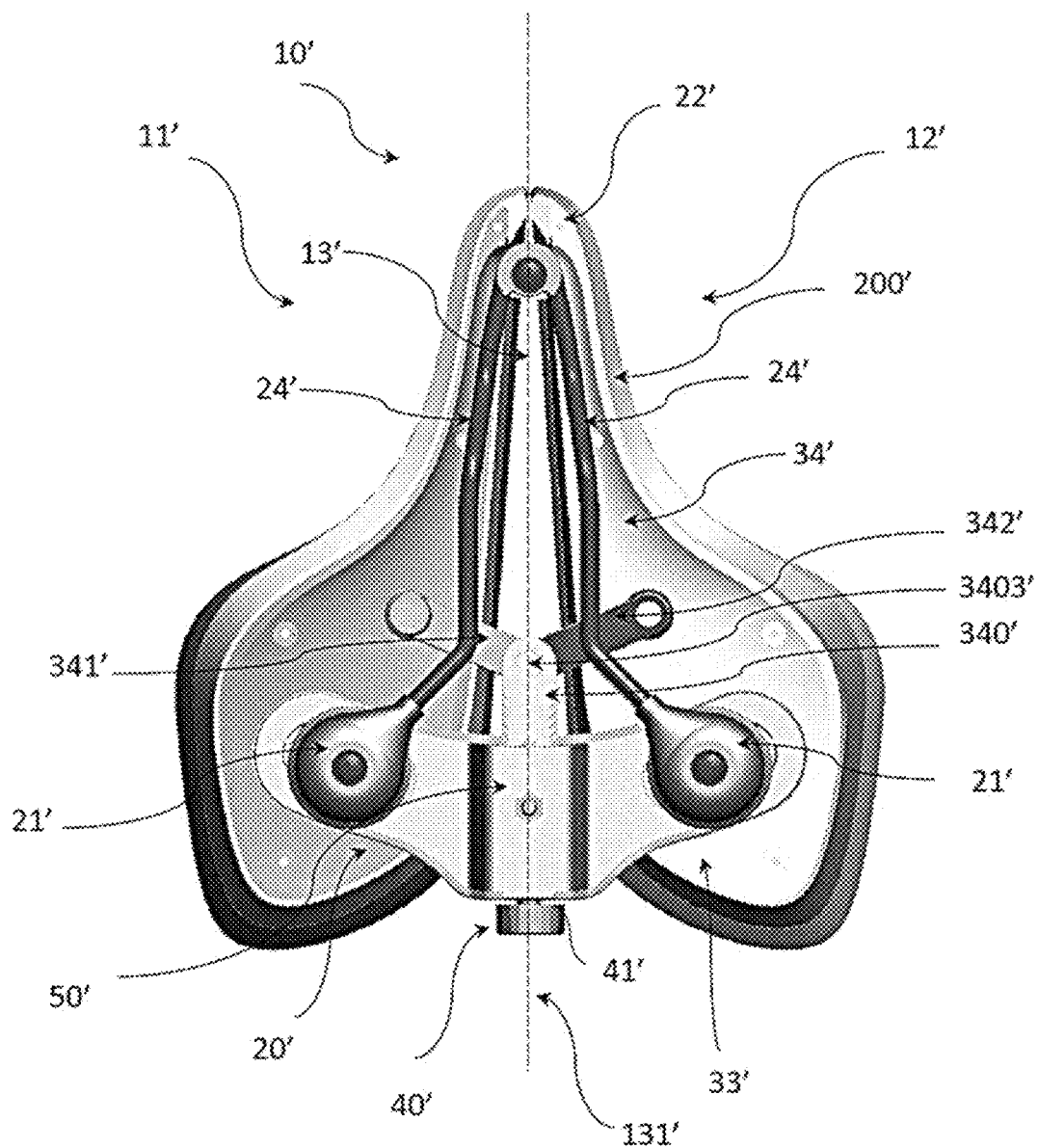
FIG. 12B is a bottom views of the adjustable seat according to the above preferred embodiment of the present invention, illustrating the extension mode thereof.
Figure 13A:
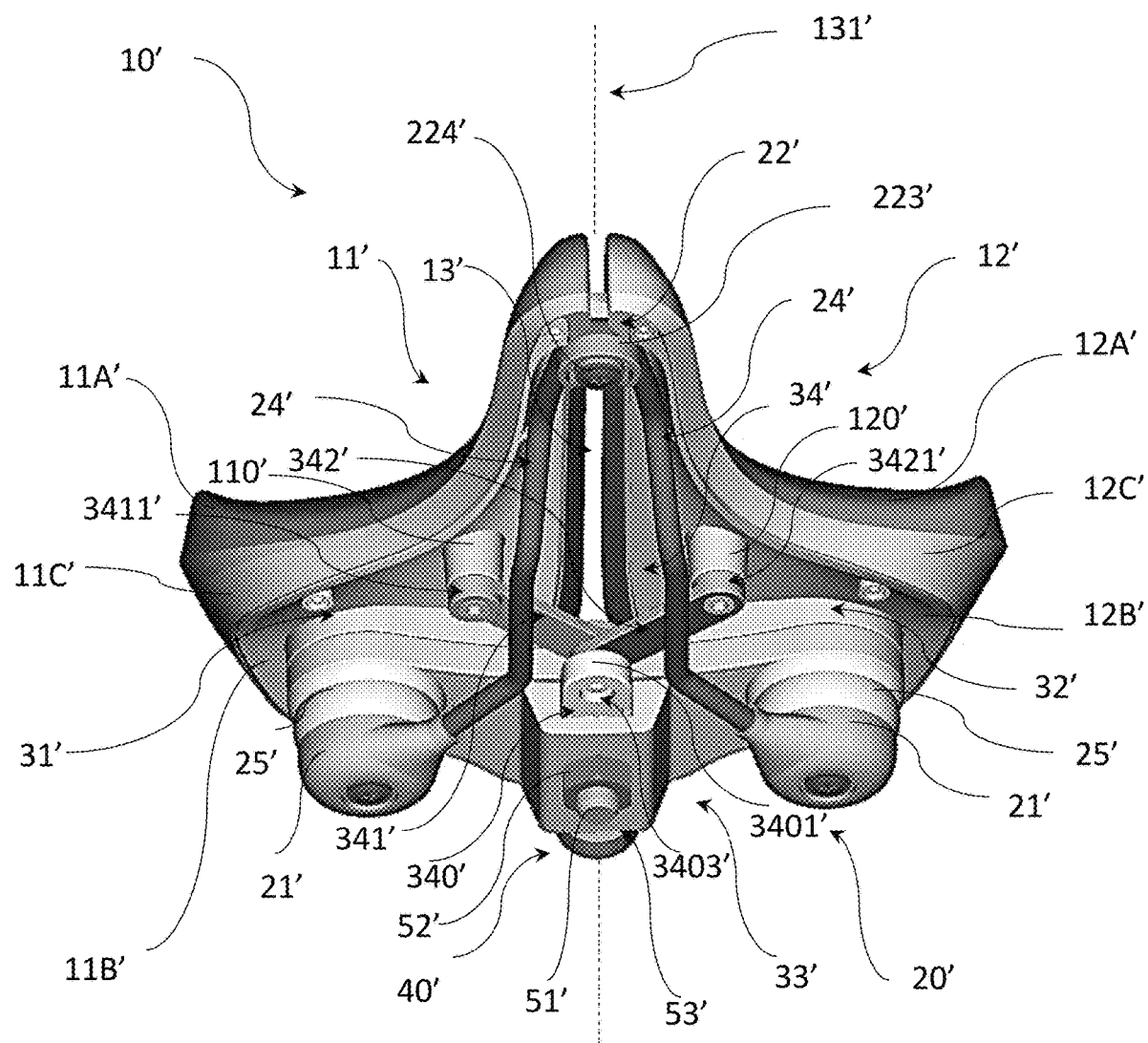
FIGS. 13A and 13B are bottom views of viewing from the front end portion and the rear end portion of the adjustable seat respectively according to the above second preferred embodiment of the present invention.
Figure 13B:
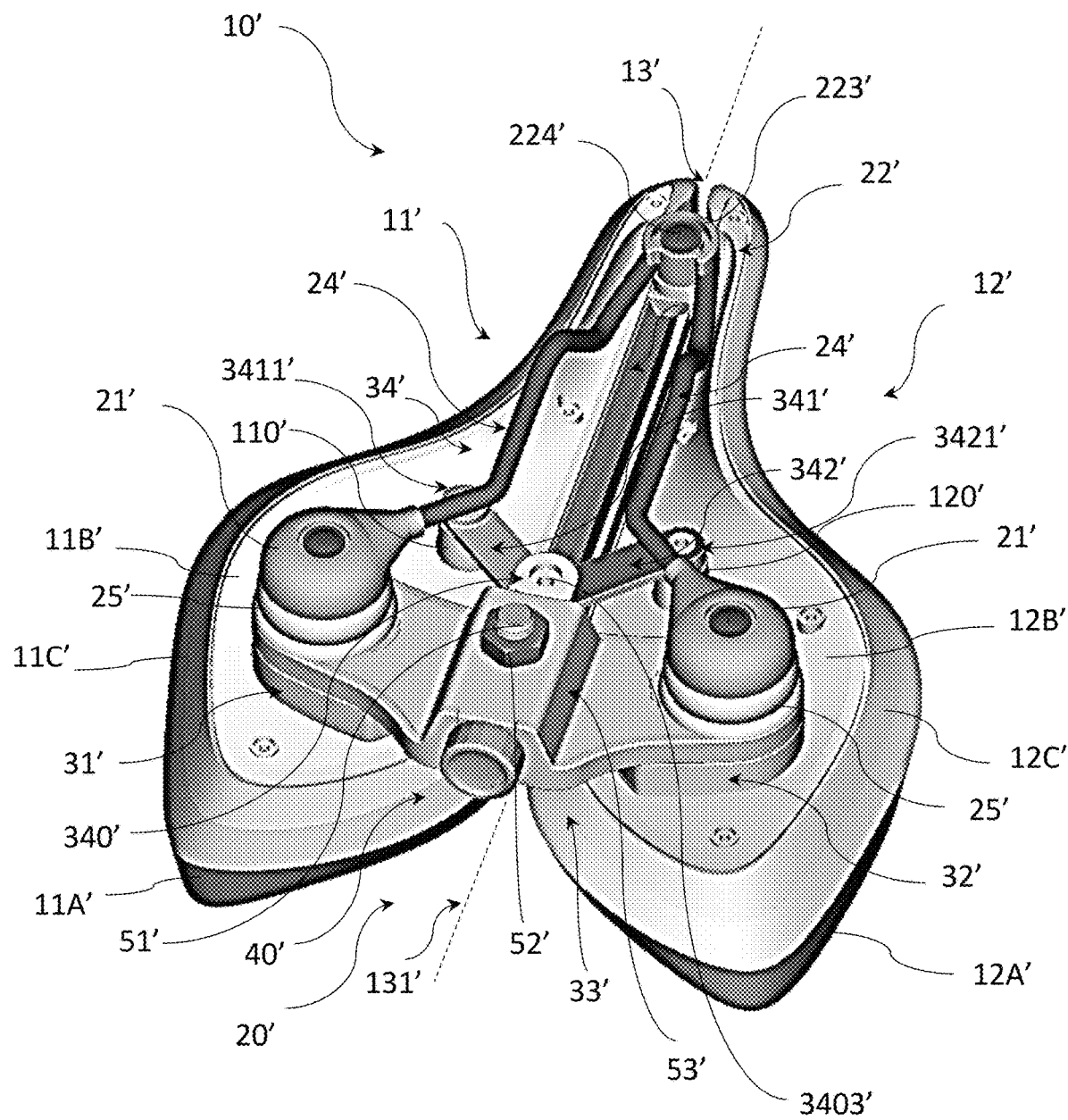

According to the second preferred embodiment, the adjustment channel 13' defines a centerline 131' which is also a centerline of the seat frame 10' between the first and second seat bodies 11', 12' (as shown in FIGS. 9 and 13B). A width of the adjustment channel 13' is selectively adjusted by the adjustable assembly 20' to selectively adjust a distance between the first and second seat bodies 11', 12' to selectively shift the seat frame 10' between a first position (compact mode) as shown in FIG. 12A and a second position (extension mode) as shown in FIG. 12B. While reducing the width of the adjustment channel 13', the distance between the first and second seat bodies 11', 12' is correspondingly decreased. Likewise, while increasing the width of the adjustment channel 13', the distance between the first and second seat bodies 11', 12' is correspondingly increased. In other words, the seat frame 10' of the adjustable seat has a minimum width in the compact mode and a maximum width in the extension mode, wherein the overall width of the seat frame 10' of the adjustable seat can be adjusted between the compact mode (first position) and the extension mode (second position) by means of the adjustable assembly 20'.

The adjustable assembly 20' is supported underneath the seat frame 10' and configured for selectively adjusting the distance between the first and second seat bodies 11', 12'. The adjustable assembly 20' comprises a retention frame 200', an adjustable means 30', an adjustor 40', and a secure arrangement 50', as shown in FIG. 10.

According to the second preferred embodiment, referring to FIGS. 10 and 14, the retention frame 200' comprises two retention bases 21', a pivot joint 22', and two retention arms 24'. The adjustable means 30' comprises a pair of first and second adjustable members 31', 32', a guiding device 33' and a transmission mechanism 34'.

The first and second adjustable members 31', 32' are coupled at the first and second seat bodies 11', 12' respectively and aligned with each other. The adjustor 40' is linked with the first and second adjustable members 31', 32' and configured to be driven to rotate about a rotation axis along or generally parallel to the centerline 131' of the adjustment channel 13' to selectively adjust a width of the adjustment channel 13' so as to selectively adjust the distance between the first and second seat bodies 31', 32'.

The pivot joint 22' is pivotally coupled with front end portions of the first and second seat bodies 11', 12' with each other such that rear end portions of the first and second seat bodies 11', 12' are capable of moving apart each other about the pivot joint 22' to adjust the wide of the adjustment channel 13', wherein the adjustor 40' is coupled with the first and second adjustable members 31', 32' through an incorporation of the guiding device 33' and the transmission mechanism 34'.

The first and second adjustable members 31', 32' are coupled at the first and second seat bodies 11', 12' respectively and aligned with each other. Preferably, the adjustable members 31', 32' are coupled at the first and second seat bodies 11', 12' at rear-portions thereof respectively where the distance between the first and second seat bodies 11', 12' to be desirably adjusted.

The retention frame 200' having one end coupled with the pivot joint 22' and a rear end coupled with the guiding device 33' for supporting the first and second seat bodies 11', 12' to selectively adjust the overall width of the seat frame 10 through an adjustable mechanical linkage of the transmission mechanism 34'.

According to the second preferred embodiment of the present invention, the front ends of the two retention arms 24' of the retention frame 200' are integrally connected to from a V-shaped front portion configured to couple with the pivot joint 22' of the seat frame 10'.

The rear ends of the two retention arms 24' are extended to securely couple with the adjustable assembly 20'. According to the second preferred embodiment, the two rear ends of the two retention arms 24's are securely coupled with the two retention bases 21' of the retention frame 200', through which the two retention bases 21' are fixedly mounted to the guiding device 33' of the adjustable means 30' of the adjustable assembly 20'.

Figure 11:
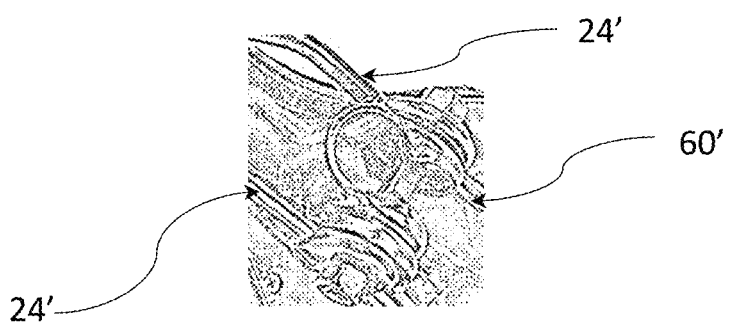
FIG. 11 is a schematic view illustrating a mounting unit for mounting to the saddle post of bicycle, exercise machine and the like securely coupled with the pair of retention arms of the adjustable seat according to the above second preferred embodiment of the present invention.

Referring to FIG. 11, as usual, a saddle mount 60', adapted for adjustably and detachably mounting to a saddle post (not shown) of a bicycle, exercise machine or the like, is able be detachably mounted to middle portions of the two retention arms 24', through which the adjustable seat of the present invention is detachably and rigidly mounted and supported by the saddle post of the bicycle, exercise machine or the like in a height adjustable manner.

The guiding device 33' comprises a guiding member 331' and a retention member 332', as shown in FIG. 14. The guiding member 331' has a predetermined curvature and two guiding arms 3311', 3312' symmetrically extended to slidably couple with the first adjustable member 31' and the second adjustable member 32' respectively. The retention member 332', having the same curvature of the guiding member 331', is disposed between the guiding member 331' and the two retention bases 21' and configured to support the guiding member 331' thereon in position and have two end wings 3321', 3322' extended underneath the rear portions of the first and second seat bodies 11', 12' of the seat frame 10', wherein the two retention bases 21' are fastened to the two end wings 3321' 3321, 3322' respectively, such that the retention frame 200', which is adapted to be mounted to the saddle post of the bicycle, exercise machine or the like, substantially support the seat frame 10' through the pivot joint 22' and the guiding device 33', such that the first and second seat bodies 11', 12' are capable of rotating about the pivot joint 22' to selectively move towards each other to reduce the width of the adjustment channel 13' or apart each other to increase the width of the adjustment channel 13' while the guiding member 331' guiding movements of the first and second seat bodies 11', 12' by sliding the first and second adjustable members 31', 32' along the two guiding arms 3311', 3312' of the guiding member 331' respectively.

The secure arrangement 50' is arranged for securely locking the positions of the first and second seat bodies 11', 12' after they are adjusted to the desired positions. According to the second preferred embodiment, the secure arrangement 50' is configured to be operated to selectively apply a pressing force against the guiding member 331' to stop any movement of the first and second seat bodies 11', 12'.

The first adjustable member 31' and the second adjustable member 32' can be fixedly mounted to first and second bottom sides of the first and second seat bodies 11', 12' respectively and have a first sliding slot 310' and a second sliding slot 320' respectively which are extended in arc shape and aligned with each other with a same radius about the pivot joint 22'.

According to the second preferred embodiment of the present invention, each of the first and second adjustable members 31', 32' has a U-shape member body 311', 321' and a U-shaped retention rim 312', 322' inwardly extended from a lower side of the U-shape member body 311', 321', such that the first sliding slot 310' and the second sliding slot 320' are defined between the retention rims 312', 322' and top sides of the first and second adjustable members 31', 32' respectively, wherein a width of each of the first and second sliding slots 310', 320' is configured being equal to or slightly wider than a width of the first and second guiding arms 3311', 3312' of the guiding member 331'.

As shown in FIG. 14, each of the first and second adjustable members 31', 32' has a side opening end 313', 323' allowing the first and second guiding arms 3311', 3312' of the guiding member 331' inserting into the first and second sliding slots 310', 320' and being retained in the first and second sliding slots 310', 320' by the retention rims 312', 322'. Accordingly, the first and second guiding arms 3311', 3312' are fittingly and slidably positioned within the first and second guiding slots 310', 320' respectively, and the first and second adjustable members 31', 32' are able to be sliding along the first and second guiding arms 3311', 3312' of the guiding member 331' about the pivot joint 22' to selectively move towards or apart each other.

In the second preferred embodiment, the first and second adjustable members 31', 32' are extension members integrally fastened to the main frame layer 11C', 12C' of the seat frame 10' and downwardly extended through member holes 11B1', 12B1' of the bottom cover layers 11B', 12B'1. That is the first and second adjustable members 31', 32' are extended from bottom rigid surfaces of the first and second seat bodies 11', 12'. In other embodiments, the first and second adjustable members 31', 32' may also be made integrally protruding from the main frame layer 11C', 12C', as shown in FIGS. 13A, 13B. Alternatively, the first and second seat bodies 11', 12' can be an integral body as illustrated in the first preferred embodiment, wherein the first and second adjustable members 31', 32' can be directly fastened to the bottom surface of the first and second seat bodies respectively or integrally produced from the bottom surface of the first and second seat bodies respectively.

The pivot joint 22' comprises a pivot axle 221' integrally and downwardly extended at a front end of the main frame layer 12C' of one of the first and second seat frame 12' and pivot ring 222' integrally formed at a front end of the main frame layer 11C' of the other seat frame 11', wherein the pivot axle 221' is arranged to penetrate through the pivot ring 222' and connected with a pivot button 223' by a fastener 224', such that the first and second seat bodies 11', 12' are able to rotate clockwise or anticlockwise about the pivot axle 221'.

The adjustor 40' is rotatably coupled with the first and second adjustable members 31', 32', preferably between the first and second adjustable members 31', 32', wherein the adjustor 40' is driven to rotate at a rotatable direction about an axis extended along the adjustment channel 13', i.e. along or parallel to the centerline 131', to selectively adjust the width of the adjustment channel 13' so as to selectively adjust the distance between the first and second seat bodies 11', 12'.

Figure 15:
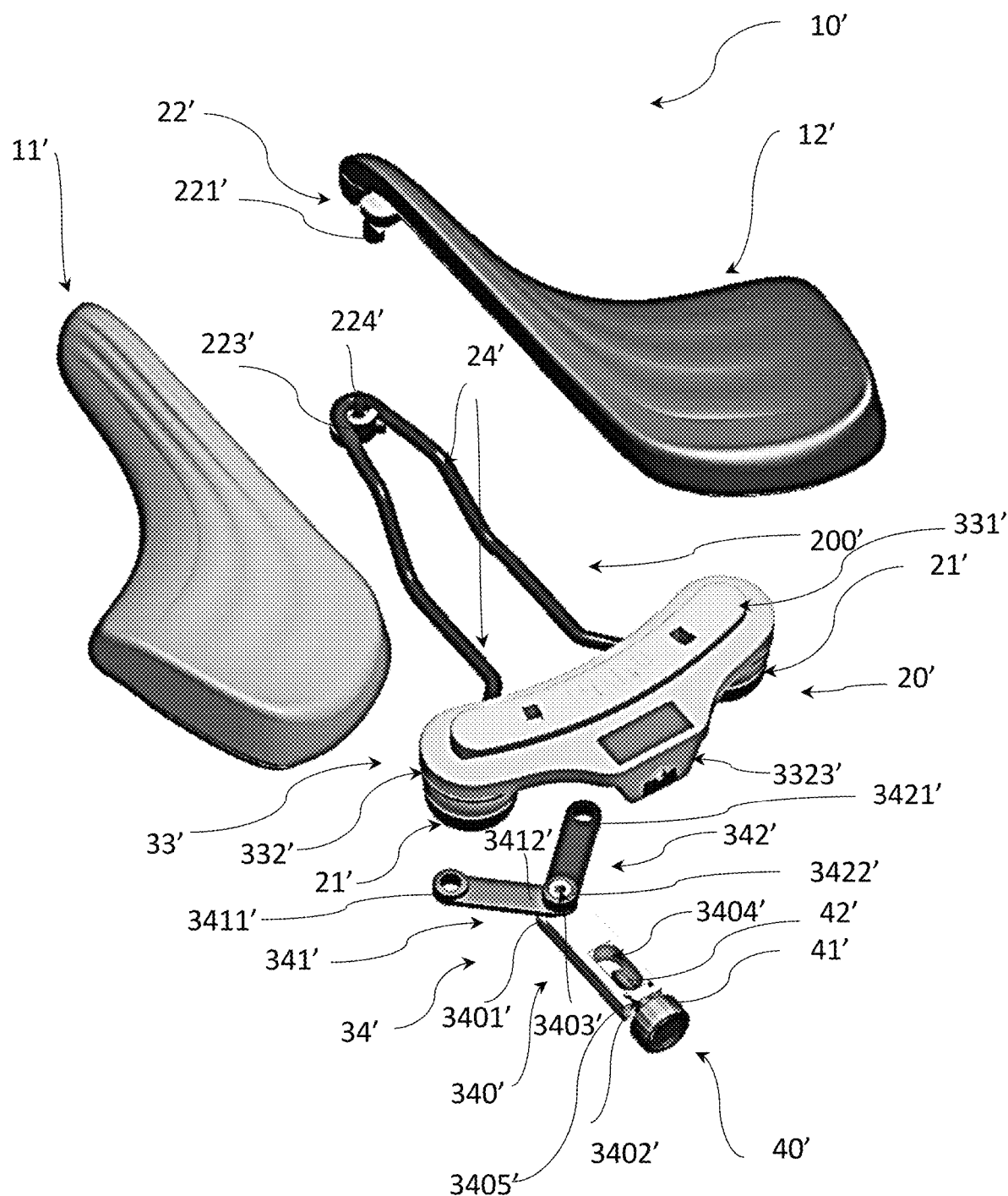
FIG. 15 is a semi-exploded view of the adjustable seat according to the above second preferred embodiment of the present invention.

According to the second preferred embodiment of the present invention, as shown in FIGS. 14 and 15, the adjustor 40', which comprises a disc form rotator 41' and a threaded shaft 42' coaxially extended from the rotator 41', is rotatably supported by the guiding device 33 to extend along the centerline 131' of the adjustment channel 13'. It is worth mentioning that the axis of the adjustor 40' is defined as a rotatable axle of the rotator 41' and the threaded shaft 42' of the adjustor 40, such that the rotator 41' of the adjustor 40 is rotatable along or parallel to the centerline 131' of the adjustment channel 13'. The adjustor 40' is preferred to be located underneath the seat frame 10' between the first and second seat bodies 11', 12', such that the adjustor 40' is not shown from the top of the adjustable seat of the present invention but it is positioned at a hand reachable location for ease to the rider to adjust the width of the seat frame 10' evening during riding of the bicycle, exercise machine or the like.

According to the second preferred embodiment of the present invention, referring to FIGS. 14, 16 and 17A-17B, the curvature of the arc shaped guiding member 331' of the guiding device 33' is arranged according to a circumferential curvature of a radius extended from a pivotal center of the pivot joint 22' to a center position of the guiding member 331', such that while the guiding member 331' is stationary supported by the retention frame 200' which is supported by the saddle post 60' (as shown in FIG. 11) and the first and second seat bodies 11', 12' are pivotally movable about the pivot joint 22' and the guiding member 331', the first and second adjustable members 31', 32' are slidable along the guiding arms 3311', 3312' respectively to adjust the overall width of the seat frame 10'.

The retention member 332' of the guiding device 33' has a size larger than the guiding member 331' and a rigid framework configured to provide a rigid support for the guiding member 331'. Please note the FIG. 14 illustrates a top side of the retention member 332' and the FIG. 17A illustrates a bottom side of the retention member 332', wherein the retention member 332' further integrally forms a side wall 3323' perpendicularly extended at a central position between the two end wings 3321', 3322' of an outer side thereof and configured for rotatably supporting the adjustor 40 by inserting the threaded shaft 42' through the side wall 3323' into the guiding device 33' and leaving the rotator 41' outside the guiding device 33' for the user to selectively rotate clockwise or anticlockwise.

Figure 17A:
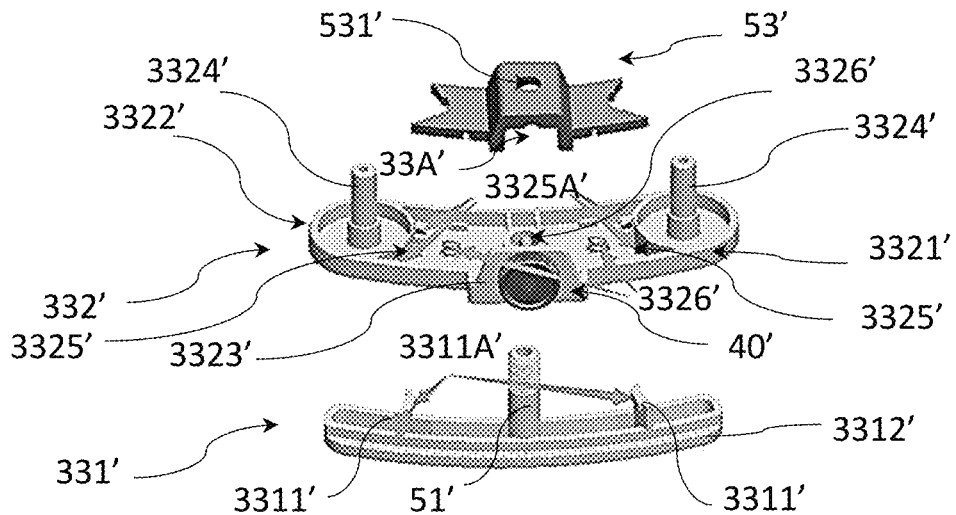
FIG. 17A is a partially exploded view illustrating components of the adjustable assembly of the adjustable seat according to the above second preferred embodiment of the present invention.
Figure 17B:
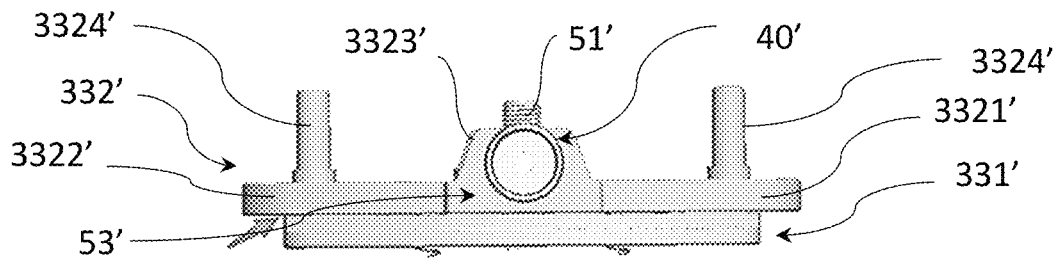
FIG. 17B is an elevation view of the assembled components illustrated of FIG. 17A according to the above second preferred embodiment of the present invention.

The connection between the guiding member 331' and the retention member 332' are accomplished by a pair of latches 3311' protruded from a bottom side of the guiding member 331, as shown in FIGS. 14 and 17A, which are configured and shaped to lock with two snap sockets 3325' formed in the retention member 332'. To facilitate a secure and smooth sliding movement between the guiding member 332' and the first and second adjustable members 31', 32', two side edges 3312' (as shown in FIG. 17A) are preferred to be formed along two longitudinal sides of the guiding member 331' to match with the retention rims 332' of the first and second adjustable members 31', 32'.

In order to rigidly connect and support the retention frame 200 in position, two tubular connection posts 3324' are preferred to be integrally and perpendicularly protruded from the two end wings 3321', 3322' of the retention member 332' respectively. The two connection posts 3324' are adapted to be inserted into the two retention bases 21' and being securely fastened by two screws 211' respectively, so as to mount and support the guiding device 33' by the retention frame 200'. Preferably, a pair of cushion members 25' are coaxially mounted between the two end wings 3321', 3322' of the retention member 332' and the two retention bases 21' respectively to provide a cushion effect to the seat frame 10' supported on top of the retention frame 200'.

According to the second preferred embodiment of the present invention, as shown in FIGS. 14 and 15, the transmission mechanism 34' of the adjustable assembly 20' comprises a linear link element 340', having a driving end 3401' and an adjusting end 3402', movably supported by the retention member 332', and a pair of first and second transverse link elements 341', 342' each having a seat end 3411', 3421' and a driven end 3412', 3422', wherein the driven ends 3412', 3422' of the first and second transverse link elements 341', 342' are pivotally connected with the driving end 3401' of the linear link element 340' along a driving axle 3403' protruded perpendicularly from the driving end 3401' of the linear link element 340' and the seat ends 3411', 3421' of the first and second transverse link elements 341', 342' are pivotally connected to the first and second seat bodies 11', 12' respectively, such that pulling the adjusting end 3402' of the linear link element 340' rearwards will drive the first and second transverse link elements 341', 342' to rotate about the driving axle 3403' to move towards each other so as to drive the first and second seat bodies 11', 12' to rotate towards each other about the pivot joint 22' to reduce the width of the adjustment channel 13' until the adjustable seat is in the compact mode. Also, pushing the adjusting end 3402' of the linear link element 340' will drive the first and second transverse link elements 341', 342' to rotate about the driving axle 3403' to move apart each other so as to drive the first and second seat bodies 11', 12' to rotate apart each other about the pivot joint 22' to increase the width of the adjustment channel 13' until the adjustable seat is in the extension mode.

Figure 16:
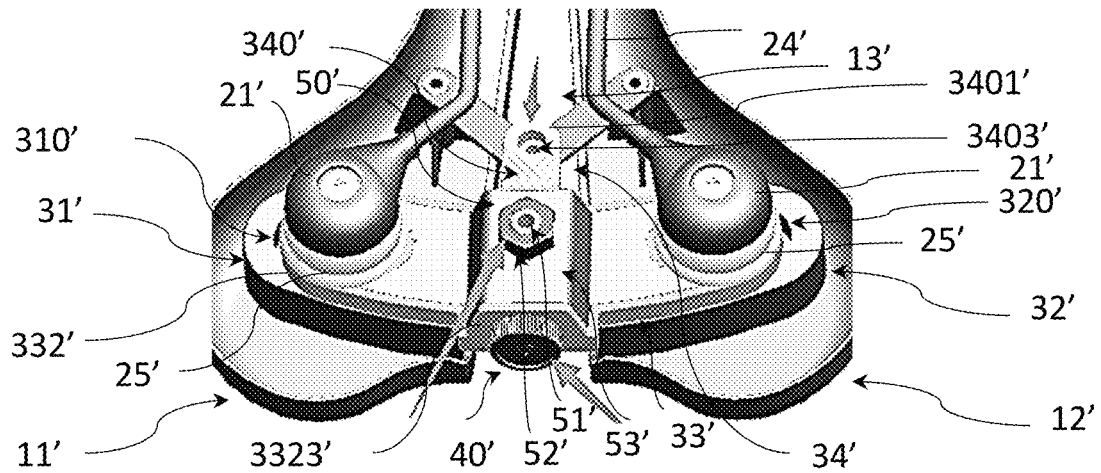
FIG. 16 is a schematic view illustrating the operation of the adjustable assembly of the adjustable seat according to the above second preferred embodiment of the present invention.

In particular, each of the first and second seat bodies 11', 12' has a seat stud 110', 120' downwardly protruded therefrom at a middle portion thereof, as shown in FIGS. 10 and 13A-13B, wherein the seat ends 3411', 3421' are pivotally connected to the two seat studs 110', 120' of the first and second seat bodies 11', 12' respectively. As shown in FIGS. 14-16, the linear link element 340' is linearly and slidably retained by the retention member 33' and the driving end 3401' of the linear link element 340' is extended frontwardly out of the retention member 33 and pivotally connected with the driven ends 3412', 3422' of the transverse link elements 341', 342' through a driving axle 3403'.

Referring to FIGS. 15 and 16, in order to securely and precisely incorporate the adjustor 40' with the guiding device 34', that is converting the rotation movement to the linear movement of the linear link element 340' and the transversal movement of the transverse link elements 341', 342', an adjustment slot 3404' is formed between the adjusting end 3402' and the driving end 3401' and an adjustment threaded hole 3405' is formed at the adjusting end 3402' communicating the outside to the adjustment slot 3404', as shown in FIG. 15, such that the thread stem 42 of the adjustor 40' is fittingly screwed through the adjustment threaded hole 3405' and extended into the adjustment slot 3404' coaxially. Since the retention member 332' is configured to rotatably mount the adjustor 40' in position through the side wall 3323' thereof and allows the rotator 41' rotatably supporting adjacent to the side wall 3323', the rotation movement of a clockwise rotation or an anticlockwise rotation of the rotator 41' of the adjustor 40' is predesignated to transmit to a linear movement of the linear link element 340' to move frontwards or rearwards. In other words, a rotation of the adjustor 40', clockwise or anticlockwise, substantially drives the linear link element 340' of the transmission mechanism 34' to move frontwards or rearwards along an axis equal to or parallel to the centerline 131' of the adjustment channel 13' underneath the seat frame 10'. Also, the movement and the threaded connection between the threaded shaft 42' of the adjustor 40' with respect to the linear link element 340' are well protected and guided by the guiding member 332' that further ensures a more compact, precise, smooth and quiet transmission operation therefor. In addition, the triangular linkage among the linear link element 340' and the two transverse link elements 341', 342' provides a smooth and effective force transmission that a slight linear pushing or pulling force applied to the linear link element 340' is converted and transmits to a strengthen and forceful transversal movement sidewardly to push or pull the first and second seat bodies 11', 12' towards or apart each other so as to adjust the width of the adjustment channel 13', i.e. the distance between the first and second seat bodies 11', 12', and the overall width of the seat frame 10' to provide a reliable and comfort support to the rider of the adjustable seat of the present invention.

It is appreciated to the space formed between the bottom surfaces of the first and the second seat bodies 11', 12' and the retention arms 24' of the retention frame 200'. Therefore, it is preferred to arrange the triangular linkage of the transmission mechanism 34' within such space, such that the first and second transverse link elements 341', 342' and the driving end 3402' of the linear link element 340' are movably positioned between the retention arms 24' and the seat frame 10'. That not only significantly reduces the overall thickness of the adjustable seat of the present invention, but also allows the two retention arms 24' to substantially provide a protection to the operation of the transmission mechanism 34'.

The pivotal connections between the seat studs 110', 120' of the first and second seat bodies 11', 12' as well as the seat ends 3411', 3421' of the transverse link elements 341', 342' and the driving end 3401' of the linear link element 340' and the driven ends 34112', 3422' of the transverse link elements can be arranged in a slightly tight manner or smooth manner, depending on the requirements of the manufacturers and users. It is appreciated that the triangular linkage mechanism of transmission mechanism 34 ensures the pivotal movement of each of the transverse link element 341', 342' and the transversal movement of each of the first and second seat bodies 11', 12' will generally be a stationary state and avoids unnecessary motion unless a pushing or pulling linear movement is applied to the linear link element 11'. Accordingly, the secure arrangement 50 can effectively secure the positions of the first and second seat bodies 11', 12' by simply performing a secure operation to the transmission mechanism 34', such as applying a pressing force against the linear link element 340' according to the second preferred embodiment of the present invention.

Accordingly, referring to FIGS. 14, 16 and 17A-17B, the secure arrangement 50' comprises a threaded secure shaft 51', a locking nut 52' and a secure frame 53'. As shown in FIG. 17A, the secure shaft 51' is integrally extended from a center position of a lower side of the guiding member 331' such that when the guiding member 331' is coupled with the retention member 332', the secure shaft 51' is downwardly extended to pass through a central hole 3326' of the retention member 332' to screw through the central threaded hole 531' of the secure frame 53'. According to the second preferred embodiment, the secure frame 53', which is made of elastic material such as plastic and has a Ω shaped cross section, is configured to have two end pieces engaged with a bottom surface of the retention member 332' while the central thread hole 531' thereof coaxially aligned with the central hole 3326 of the retention member 332', wherein the secure frame 53' also contributes a component of the guiding device 33', that is functioned as a cover of the retention member 332' to enclose the screwing linkage of the threaded shaft 42' and the linear link element 340' within a linkage cavity 33A' defined between the secure frame 53' and the retention member 332' (as shown in FIG. 17A), so as to provide a further coverage and protection to the movable arrangement, i.e. the threaded shaft 42', the adjustment slot 3404, and the most of the linear link element 340'.

In view of above, by screwing the locking nut 52' to tighten with the secure shaft 51', the guiding member 331' is pulled to press against retention member 332' to strengthen to connection of the guiding member 331' and the retention member 332' of the guiding device 33'. As shown in FIG. 17A, when the locking nut 52' is further tightened with the secure shaft 51', pressing lugs 3311A' of the guiding arms 3311' of the guiding member 331' will work with four slanted surfaces 3325A' provided around the snap sockets 3325' of the retention member 332' to cause the secure frame 53' to slightly deform and tighten the secure frame 53' by means of the pressing lugs 3311A' so as to press the first and second seat bodies 11', 12' in position as well as the linear link element 340' to lock the relative positions of the linear link element 340' and the two transverse link elements 341', 342', such that the adjusted positions of the first and second seat bodies 11', 12', i.e. the overall width of the seat frame 10, is locked. By turning the locking nut 52' in opposite direction, the locking state is released by untightening the locking nut 52' with respect to the secure shaft 51', the adjustment of the transmission mechanism 34' is allowed. For ease of the unlocking operation, a pair of springs 3326' is optionally arranged between the lower surface of the retention member 332' and the secure frame 53' so as to provide a resilient force to recover the deformation of the secure frame 53' once the tightening force of the locking nut 52' is released. It should be noted that the pair of springs 3326' can be omitted when the secure frame 53' is made of elastic material.

According to the second preferred embodiment of the present invention, the adjustor 40' is rotatably coupled with the adjusting end 3402' of the linear link element 340' such that a rotation of the adjustor 40' in different directions would substantially push or pull the linear link element 340' to move frontward or rearward along an axis thereof so as to drive the first and second transverse link elements 341', 342' as well as the first and second seat bodies 11', 12' to move to desire positions correspondingly.

In order to selective adjust the overall width of the seat frame 10', the user is able to actuate the adjustor 40' in order to rotate the adjustor 40' for selectively adjusting the distance between the first and second seat bodies 11', 12'. In the compact mode (first position) of the seat frame 10', i.e. the original position of the seat frame 10', as shown in FIG. 12A, the width of the adjustment channel 13' is uniform, such that the distance between the front portions of the first and second seat bodies 11', 12' is the same as the distance between the rear portions of the first and second seat bodies 11', 12'. When the rotator 41' is rotated at one direction to drive the linear link element 340' linearly sliding rearwards to pull the first and second transverse link elements 341', 342' to swing toward each other, the first and second seat bodies 11', 12' are moved to its first position (original position) and the seat frame 10 is in the compact mode, where the width of the adjustment channel 13' is uniform. When the rotator 41' is rotated at the opposite direction to drive the linear link element 340' frontwards, the first and second transverse link elements 341', 342' are pushed to pivotally move away from each other until the two transverse link elements 341', 342' are outwardly and transversely moved, as shown in FIG. 12B, the first and second seat bodies 11', 12' are moved to its second position, i.e. the extension mode, as shown in FIG. 12B. At the second position (extension mode) of the seat frame 10', the width of the adjustment channel 13' is gradually increased from front to rear. In other words, the distance between the front portions of the first and second seat bodies 11', 12' is shorter than the distance between the rear portions of the first and second seat bodies 11', 12' and the overall width of the seat frame 10' is increased accordingly.

In view of above, the adjustable seat for bicycle, exercise machine or the like is capable of selectively adjusting dimension size thereof to fittingly support the user. The adjustable seat is selectively adjusted by adjusting a distance between the first and second seat bodies 11', 12' by mean of the adjustable assembly 20'. The use may simply rotate the rotator 41' of the adjustor 40' located at the rear portion under the seat frame 10' to adjust the dimension size of the seat frame 10', wherein the rotation force is converted to linear force to drive the first and second seat bodies 11', 12' to move transversally towards or apart each other through the transmission mechanism 34'.

According to the preferred embodiments of the present invention, no complicate component is required to incorporate in the present invention. Especially in the second preferred embodiment, the rotation movement of the rotator 41' is precisely and smoothly transmitted into a linear movement of the linear link element 340' simply through the screwing incorporation of the threaded shaft 42' and the thread hole 3405' while the threaded shaft 42 extended and retained along the adjustment slot 3404' that is also arranged to allow the secure shaft 51' passing through and being locked with the locking nut 52'. Such arrangement is simple but effective to utilize the minimum elements to provide the precise and smooth adjustment, the transmission of rotation movement to linear movement, the interconnection of the guiding member 331', the retention member 332', the secure frame 53', and the locking function of the secure arrangement 50' at the same time.

The triangular linkage mechanism among the linear link element 340' and the first and second transverse link elements 341', 342' provides strengthen and smooth conversion of the axial linear force to the pivotal transverse force to move the first and second seat bodies 11', 12' that allows the first and second seat bodies 11', 12' to be adjusted in a stepless manner. In other words, the overall width of the seat frame 10' and the distance between the first and second seat bodies 11', 12' can be adjusted to any width between the compact mode and the extension mode. In addition, such triangular linkage also allows the positions of the first and second seat bodies 11', 12' to be locked at desire positions by applying perpendicular pressure to the linear and transverse movement plane of the linear and transverse link elements 340', 342', 342' through the perpendicular secure arrangement of the secure shaft 51' with respect to the locking nut 52' and secure frame 53'.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An adjustable seat, comprising:
a seat frame comprising a first seat body and a second seat body spaced apart each other to define an adjustment channel between said first and second seat bodies; and an adjustable assembly supported underneath said seat frame and configured to selectively adjust a distance between said first and second seat bodies, wherein said adjustable assembly comprises:
a retention frame configured to support said seat frame thereon for mounting said adjustable seat to the bicycle, exercise machine and the like;
a first adjustable member and a second adjustable member coupled at said first seat body and said second seat body respectively and aligned with each other;
an adjustor arranged underneath said frame and to be driven to rotate at a rotatable direction along a centerline of said adjustable channel to selectively adjust a width of said adjustment channel so as to adjust the distance between said first seat body and said second seat body;
a transmission mechanism arranged between said retention frame and said seat frame, wherein said adjustor is incorporated with said first adjustable member and said second adjustable member to transmit a rotation movement of said adjustor to a linear movement to selectively drive said first adjustable member and said second adjustable member to move towards or apart each other between a compact mode and an extension mode of the seat frame, wherein in the compact mode, the distance between said first seat body and said second seat body is minimized, and in the extension mode, the distance between said first seat body and said second seat body is maximized; and
a guiding device supported between said first and second adjustable members and said retention frame and incorporated with said transmission mechanism to guide movement of said first adjustable member and said second adjustable member along a predetermined path between the compact mode and the extension mode.

2. The adjustable seat, as recited in claim 1, wherein said adjustor comprises a rotator and a shaft coaxially extended from said rotator and said transmission mechanism comprises a linear link element and first and second transverse link elements each pivotally connected with said linear link element, wherein said linear link element is coaxially coupled with said shaft of said adjustor in such a manner that a rotating movement of said shaft of said adjustor is transmitted to a linear movement of said linear link element that drives said first and second transverse link elements to selectively move said first adjustable member and said second adjustable member towards or apart each other so as to adjust the distance between said first seat body and said second seat body.

3. The adjustable seat, as recited in claim 2, wherein each of said first and second traverse link elements, extended between said seat frame and said retention frame, has a seat end and a driven end, wherein said seat ends of said first and second traverse link elements are pivotally connected to said first seat body and said second seat body respectively and said driven ends of said first and second transverse link elements are pivotally connected with said linear link element, such that a pushing of said linear link element to move linearly frontwards drives said first and second transverse link elements to pivotally move apart each other transversely to drive said first adjustable member and said second adjustable member to move apart each other transversely to increase the distance between said first seat body and said second seat body, and that a pulling of said linear link element to move linearly rearwards drives said first and second transverse link elements to move toward each other transversely to drive said first adjustable member and said second adjustable member to move toward each other transversely to reduce the distance of said first seat body and said second seat body.

4. The adjustable seat, as recited in claim 3, wherein said linear link element has a driving end, an adjusting end, an adjustment slot extended between said driving end and said adjusting end, and an adjustment threaded hole communicating said adjustment slot with outside, wherein said shaft of said adjustor is a threaded shaft screwed in said adjustment threaded hole and extended to said adjustment slot, wherein said linear link element transmits a clockwise or anticlockwise rotation of said rotator and said shaft to a linear movement of pushing said linear link element frontwards or pulling said linear link element rearwards.

5. The adjustable seat, as recited in claim 1, wherein said retention frame comprises a pivot joint pivotally connecting front ends of said first seat body and said second seat body, wherein said guiding device comprises a guiding member and a retention member, wherein said guiding member has a predetermined curvature and first and second guiding arms symmetrically extended to slidably couple with said first adjustable member and said second adjustable member respectively, wherein said retention member, having the same curvature of said guiding member, is disposed between said guiding member and said retention frame and configured to support said guiding member thereon in position and have two end wings extended underneath rear portions of said first seat body and said second seat body of said seat frame to connect with said retention frame, through which said seat frame is supported by said retention frame, wherein each of said first adjustable member and said second adjustable member has a U-shape cross section and defines a guiding slot, wherein said first and second guiding arms of said guiding member are fittingly and slidably positioned within said guiding slots of said first adjustable member and said second adjustable member respectively, such that said first adjustable member and said second adjustable are able to be sliding along said first and second guiding arms of said guiding member about said pivot joint to selectively move towards or apart each other.

6. The adjustable seat, as recited in claim 2, wherein said retention frame comprises a pivot joint pivotally connecting front ends of said first seat body and said second seat body, wherein said guiding device comprises a guiding member and a retention member, wherein said guiding member has a predetermined curvature and first and second guiding arms symmetrically extended to slidably couple with said first adjustable member and said second adjustable member respectively, wherein said retention member, having the same curvature of said guiding member, is disposed between said guiding member and said retention frame and configured to support said guiding member thereon in position and have two end wings extended underneath rear portions of said first seat body and said second seat body of said seat frame to connect with said retention frame, through which said seat frame is supported by said retention frame, wherein each of said first adjustable member and said second adjustable member has a U-shape cross section and defines a guiding slot, wherein said first and second guiding arms of said guiding member are fittingly and slidably positioned within said guiding slots of said first adjustable member and said second adjustable member respectively, such that said first adjustable member and said second adjustable are able to be sliding along said first and second guiding arms of said guiding member about said pivot joint to selectively move towards or apart each other.

7. The adjustable seat, as recited in claim 3, wherein said retention frame comprises a pivot joint pivotally connecting front ends of said first seat body and said second seat body, wherein said guiding device comprises a guiding member and a retention member, wherein said guiding member has a predetermined curvature and first and second guiding arms symmetrically extended to slidably couple with said first adjustable member and said second adjustable member respectively, wherein said retention member, having the same curvature of said guiding member, is disposed between said guiding member and said retention frame and configured to support said guiding member thereon in position and have two end wings extended underneath rear portions of said first seat body and said second seat body of said seat frame to connect with said retention frame, through which said seat frame is supported by said retention frame, wherein each of said first adjustable member and said second adjustable member has a U-shape cross section and defines a guiding slot, wherein said first and second guiding arms of said guiding member are fittingly and slidably positioned within said guiding slots of said first adjustable member and said second adjustable member respectively, such that said first adjustable member and said second adjustable are able to be sliding along said first and second guiding arms of said guiding member about said pivot joint to selectively move towards or apart each other.

8. The adjustable seat, as recited in claim 4, wherein said retention frame comprises a pivot joint pivotally connecting front ends of said first seat body and said second seat body, wherein said guiding device comprises a guiding member and a retention member, wherein said guiding member has a predetermined curvature and first and second guiding arms symmetrically extended to slidably couple with said first adjustable member and said second adjustable member respectively, wherein said retention member, having the same curvature of said guiding member and being disposed between said guiding member and said retention frame, is configured to retain said guiding member thereon in position and have two end wings extended underneath rear portions of said first seat body and said second seat body of said seat frame to connect with said retention frame, through which said seat frame is supported by said retention frame, wherein each of said first adjustable member and said second adjustable member has a U-shape cross section and defines a guiding slot, wherein said first and second guiding arms of said guiding member are fittingly and slidably positioned within said guiding slots of said first adjustable member and said second adjustable member respectively, such that said first adjustable member and said second adjustable are able to be sliding along said first and second guiding arms of said guiding member about said pivot joint to selectively move towards or apart each other.

9. The adjustable seat, as recited in claim 5, wherein said retention frame further comprises two retention bases and two retention arms, wherein said two retention bases are mounted to said two end wings of said retention member and two rear ends of said two retention arms are securely coupled with said two retention bases respectively, wherein as secure shaft is integrally extended from a center position of said guiding member such that when said guiding member is coupled with said retention member, said secure shaft is downwardly extended connect said guiding member with said retention member.

10. The adjustable seat, as recited in claim 6, wherein said retention frame further comprises two retention bases and two retention arms, wherein said two retention bases are mounted to said two end wings of said retention member and two rear ends of said two retention arms are securely coupled with said two retention bases respectively, wherein as secure shaft is integrally extended from a center position of said guiding member such that when said guiding member is coupled with said retention member, said secure shaft is downwardly extended connect said guiding member with said retention member.

11. The adjustable seat, as recited in claim 7, wherein said retention frame further comprises two retention bases and two retention arms, wherein said two retention bases are mounted to said two end wings of said retention member and two rear ends of said two retention arms are securely coupled with said two retention bases respectively, wherein as secure shaft is integrally extended from a center position of said guiding member such that when said guiding member is coupled with said retention member, said secure shaft is downwardly extended connect said guiding member with said retention member.

12. The adjustable seat, as recited in claim 8, wherein said retention frame further comprises two retention bases and two retention arms, wherein said two retention bases are mounted to said two end wings of said retention member and two rear ends of said two retention arms are securely coupled with said two retention bases respectively, wherein as secure shaft is integrally extended from a center position of said guiding member such that when said guiding member is coupled with said retention member, said secure shaft is downwardly extended connect said guiding member with said retention member.

13. The adjustable seat, as recited in claim 1, wherein said adjustable assembly further comprises a secure arrangement incorporated with guiding device to selectively lock said adjustable assembly to secure desire positions of said first seat body and said second seat body after adjustment of said first seat body and said second seat body or to unlock said adjustable assembly for operation to adjust the distance between said first seat body and said second seat body.

14. The adjustable seat, as recited in claim 2, wherein said adjustable assembly further comprises a secure arrangement incorporated with guiding device to selectively lock said adjustable assembly to secure desire positions of said first seat body and said second seat body after adjustment of said first seat body and said second seat body or to unlock said adjustable assembly for operation to adjust the distance between said first seat body and said second seat body.

15. The adjustable seat, as recited in claim 4, wherein said adjustable assembly further comprises a secure arrangement incorporated with guiding device to selectively lock said adjustable assembly to secure desire positions of said first seat body and said second seat body after adjustment of said first seat body and said second seat body or to unlock said adjustable assembly for operation to adjust the distance between said first seat body and said second seat body by selectively applying a pressing force against said guiding member to stop any moment of said first seat body and said second seat body.

16. The adjustable seat, as recited in claim 15, wherein said secure arrangement comprises a secure nut, a secure frame mounted on said retention member to enclose said adjustment slot and said adjusting end of said linear link element between said secure frame and said retention member, and a threaded secure shaft which is integrally extended from a center position of a lower side of said guiding member and passes through said retention member coupled with said guiding member and said secure frame, said adjustment slot of said linear link element and said recure frame to screw with said secure nut to retain said guiding member on said retention member, wherein by securely tightening said secure nut with said secure shaft to press said secure frame to lock relative positions of said linear link element and said transverse link elements such that the desire positions of said first seat body and said second seat body after adjustment thereof.

17. The adjustable seat, as recited in claim 8, wherein said adjustable assembly further comprises a secure arrangement incorporated with guiding device to selectively lock said adjustable assembly to secure desire positions of said first seat body and said second seat body after adjustment of said first seat body and said second seat body or to unlock said adjustable assembly for operation to adjust the distance between said first seat body and said second seat body by selectively applying a pressing force against said guiding member to stop any moment of said first seat body and said second seat body.

18. The adjustable seat, as recited in claim 17, wherein said secure arrangement comprises a secure nut, a secure frame mounted on said retention member to enclose said adjustment slot and said adjusting end of said linear link element between said secure frame and said retention member, and a threaded secure shaft which is integrally extended from a center position of a lower side of said guiding member and passes through said retention member coupled with said guiding member and said secure frame, said adjustment slot of said linear link element and said recure frame to screw with said secure nut to retain said guiding member on said retention member, wherein by securely tightening said secure nut with said secure shaft to press said secure frame to lock relative positions of said linear link element and said transverse link elements such that the desire positions of said first seat body and said second seat body after adjustment thereof.

19. The adjustable seat, as recited in claim 12, wherein said adjustable assembly further comprises a secure arrangement incorporated with guiding device to selectively lock said adjustable assembly to secure desire positions of said first seat body and said second seat body after adjustment of said first seat body and said second seat body or to unlock said adjustable assembly for operation to adjust the distance between said first seat body and said second seat body by selectively applying a pressing force against said guiding member to stop any moment of said first seat body and said second seat body.

20. The adjustable seat, as recited in claim 19, wherein said secure arrangement comprises a secure nut, a secure frame mounted on said retention member to enclose said adjustment slot and said adjusting end of said linear link element between said secure frame and said retention member, and a threaded secure shaft which is integrally extended from a center position of a lower side of said guiding member and passes through said retention member coupled with said guiding member and said secure frame, said adjustment slot of said linear link element and said recure frame to screw with said secure nut to retain said guiding member on said retention member, wherein by securely tightening said secure nut with said secure shaft to press said secure frame to lock relative positions of said linear link element and said transverse link elements such that the desire positions of said first seat body and said second seat body after adjustment thereof.

\* \* \* \* \*